(12) United States Patent
Tomita et al.

(10) Patent No.: US 6,510,834 B1
(45) Date of Patent: Jan. 28, 2003

(54) CONTROL FOR SPARK-IGNITED DIRECT FUEL INJECTION INTERNAL COMBUSTION ENGINE

(75) Inventors: Masayuki Tomita, Bucks (GB); Kimiyoshi Nishizawa, Yokohama (JP); Iwao Yoshida, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/649,995

(22) Filed: Aug. 29, 2000

(30) Foreign Application Priority Data

Aug. 31, 1999 (JP) .......................... 11-245390
Sep. 16, 1999 (JP) .......................... 11-262260

(51) Int. Cl.[7] .......................... F02B 17/00; F02D 43/00
(52) U.S. Cl. .................. 123/295; 123/305; 123/406.47
(58) Field of Search .................. 123/295, 305, 123/406.19, 406.23, 406.26, 406.44, 406.47, 443

(56) References Cited

U.S. PATENT DOCUMENTS

| | | | | |
|---|---|---|---|---|
| 5,755,198 A | * | 5/1998 | Grob et al. ................. | 123/295 |
| 5,947,079 A | * | 9/1999 | Sivashankar et al. ....... | 123/295 |
| 5,979,397 A | * | 11/1999 | Machida et al. ............ | 123/295 |
| 5,992,372 A | * | 11/1999 | Nakajima ................... | 123/295 |
| 5,996,547 A | * | 12/1999 | Machida et al. ............ | 123/295 |
| 6,006,717 A | * | 12/1999 | Suzuki et al. ............... | 123/295 |
| 6,026,779 A | * | 2/2000 | Obata et al. ................ | 123/295 |
| 6,050,238 A | * | 4/2000 | Suzuki et al. ............... | 123/295 |
| 6,058,905 A | * | 5/2000 | Nagaishi et al. ............ | 123/295 |
| 6,062,190 A | * | 5/2000 | Nakajima ................... | 123/295 |
| 6,062,191 A | * | 5/2000 | Ooba ......................... | 123/295 |
| 6,089,206 A | * | 7/2000 | Suzuki et al. ............... | 123/295 |
| 6,234,139 B1 | * | 5/2001 | Taga et al. .................. | 123/295 |
| 6,244,244 B1 | * | 6/2001 | Fuwa et al. ................. | 123/295 |
| 6,302,081 B1 | * | 10/2001 | Moser et al. ................ | 123/295 |
| 6,425,366 B1 | * | 7/2002 | Ogawa et al. .............. | 123/295 |

FOREIGN PATENT DOCUMENTS

| | | | | |
|---|---|---|---|---|
| JP | 62-191622 | | 8/1987 | |
| JP | 2-169834 | | 6/1990 | |
| JP | 10-169488 | | 6/1998 | |
| JP | 10-212986 | | 8/1998 | |
| JP | 10-212987 | | 8/1998 | |
| JP | 11-101147 | | 4/1999 | |
| JP | 47973 | * | 2/2002 | ........... F02D/41/04 |

* cited by examiner

Primary Examiner—Tony M. Argenbright
Assistant Examiner—Hai H. Huynh
(74) Attorney, Agent, or Firm—Foley & Lardner

(57) ABSTRACT

The control system of a spark-ignited direct fuel injection internal combustion engine has a control unit for operating the internal combustion engine selectively between a homogeneous combustion mode for starting the engine or after a warm-up thereof and a stratified combustion mode for promoting an activation of a catalytic converter, in response to a request according to an engine operating condition. The control unit further adjusts a parameter that affects engine torque of the internal combustion engine so as to reduce the undesired sudden change of the engine torque when the combustion mode is converted.

17 Claims, 16 Drawing Sheets

CONTROL FOR SPARK-IGNITED DIRECT FUEL INJECTION INTERNAL COMBUSTION ENGINE

The contents of Japanese Patent Applications Nos. 11-245390, with a filing date of Aug. 31, 1999, in Japan, and 11-262260, with a filing date of Sep. 16, 1999, in Japan, are hereby incorporated by reference.

BACKGROUND OF THE INVENTION

The present invention relates to a technique for controlling a spark-ignited direct fuel injection internal combustion engine.

Recently, the technique of direct fuel injection in a spark ignition engine is under development to improve fuel efficiency and emission control by injecting fuel directly into a combustion chamber (or each combustion chamber). A control system for such a type normally operates combustion of a homogeneous air fuel mixture distributed uniformly throughout the combustion chamber by fuel injection on the intake stroke. In a predetermined engine operating condition (such as a condition of low revolution speed and low load), the control system operates with ultra lean combustion by injecting fuel on the compression stroke so as to produce an ignitable stratified air fuel mixture around an ignition plug.

Japanese Patent Provisional (Kokai) Publications Nos. 62(1987)-191622 and 2(1990)-169834 disclose internal combustion engines of such a type.

Japanese Patent Provisional (Kokai) Publications No. 10(1998)-169488 further discloses a related technology for activating a catalytic converter. According to this technology, there is produced the stratified air fuel mixture that is richer than the stoichiometric air fuel ratio (i.e. theoretical air fuel ratio) locally around the ignition plug so as to produce a region wanting the oxygen in the combustion chamber. The combustion of the stratified air fuel mixture produces the products of incomplete combustion (such as CO) in this region and raises exhaust gas temperature by means of reacting the product of incomplete combustion (CO) and unburned fuel with the oxygen in the background of the oxygen-lacking region after a main combustion (i.e. combustion by spark ignition and flame propagation thereby).

In the technology mentioned above, the homogeneous combustion is necessary at first to start the engine that has not finished its warm-up for achieving the stable combustibility, and then the stratified combustion is operated according to a request for raising the exhaust gas temperature. After the catalytic converter has been activated, the stratified combustion is converted to the homogeneous lean combustion, which is further converted to the stratified lean combustion, or the homogeneous stoichiometric combustion according to the engine operating condition.

However, the stratified combustion has lower thermal efficiency than the homogeneous combustion in which the air fuel mixture is sufficiently mixed throughout the combustion chamber, therefore there is an undesired sudden change of the engine torque (that is referred to as 'the torque differentiation' later) when the stratified combustion is converted to the homogeneous combustion, and vice versa. Such torque differentiation may impair the drivability.

SUMMARY OF THE INVENTION

Therefore, an object of the invention is to provide a spark-ignited direct fuel injection internal combustion engine that can reduce the torque differentiation mentioned above when a combustion mode is converted according to the engine operating condition.

The above and other objects of the present invention can be accomplished by a control system for an internal combustion engine that comprises an internal combustion engine having a combustion chamber, an injector provided for the combustion chamber to directly inject fuel and produce an air fuel mixture therein, and an ignition plug provided for the combustion chamber to ignite the air fuel mixture. The control system also comprises a controller for operating the internal combustion engine in one of combustion modes selectively between a homogeneous combustion mode and a stratified combustion mode in response to a request according to an engine operating condition. The controller further adjusts a parameter that affects engine torque of the internal combustion engine so as to reduce the torque differentiation when the combustion mode is converted.

The controller may operate the stratified combustion mode by controlling fuel injection quantity, fuel injection timing, and ignition timing so as to produce and combust a stratified air fuel mixture that is of richer-than-stoichiometric air fuel ratio around the ignition plug, operate the homogeneous combustion mode by controlling the fuel injection quantity, the fuel injection timing, and the ignition timing so as to produce and combust homogeneous air fuel mixture that is distributed uniformly throughout the combustion chamber, convert the combustion mode between the stratified combustion mode and the homogeneous combustion mode upon occurrence of the request according to the engine operating condition, and adjust the parameter so as to reduce the torque divergence when the combustion mode is converted.

If there is the request for raising the exhaust gas temperature, the controller produces and combusts the stratified air fuel mixture that is richer than stoichiometric ratio around the ignition plug (by controlling the fuel injection quantity, the fuel injection timing, and the ignition timing by operating the stratified combustion mode). Because of the richer-than-stoichiometric stratified air fuel mixture, the products of incomplete combustion (such as CO) is produced by the main combustion. The product of incomplete combustion is combusted in the combustion chamber and/or an exhaust passage after the main combustion, therefore the controller can raise the exhaust gas temperature and then promote an activation of an exhaust emission control device such as a catalytic converter.

On the other hand, there is generated a request to operate the homogeneous combustion mode in such engine operating conditions that the engine has not finished its warm-up or the exhaust emission control device has been activated. In such conditions, the controller produces and combusts the air fuel mixture distributed uniformly throughout the combustion chamber (by controlling the fuel injection quantity, the fuel injection timing, and the ignition timing by operating the homogeneous combustion mode).

The controller adjusts the parameter that affects the engine torque so as to reduce the torque differentiation (by adjusting the parameter mentioned above) when the combustion mode is converted according to a change of the request between the homogeneous combustion mode and the stratified combustion mode.

In this manner, the torque differentiation can be reduced, and stable drivability can be achieved.

An exhaust system of the control system may comprise an exhaust passage connected to the internal combustion engine and an exhaust emission control device disposed in the exhaust passage. To generate the request for operating the stratified combustion mode, the controller may check activeness or inactiveness of the exhaust emission control device and permit the stratified combustion mode when the exhaust emission control device is inactive.

In operating the stratified combustion mode, it is desirable that an average air fuel ratio in the entirety of the combustion chamber is set at the stoichiometric ratio to achieve the desired emission performance by the emission control device. Especially when the average air fuel ratio is set substantially equal to the stoichiometric ratio, the amounts of CO and residual oxygen are approximately equivalent and the temperature of the exhaust emission control device increases very efficiently.

The stratified combustion mode may be operated by dividing a fuel injection into a first portion injected on an intake stroke for producing a leaner-than-stoichiometric air fuel mixture throughout the combustion chamber and a second portion injected on a compression stroke for producing a richer-than-stoichiometric air fuel mixture around the ignition plug, and combusting the air fuel mixture produced in the combustion chamber.

In this stratified combustion mode, the richer-than-stoichiometric air fuel mixture around the ignition plug combusts in a main combustion (i.e. combustion by spark ignition and flame propagation thereby) and produces carbon monoxide (CO) due to the incomplete combustion. The carbon monoxide is re-combusted with the leaner-than-stoichiometric air fuel mixture in the background of the stratified air fuel mixture. Propagation of re-combusting flame over the combustion chamber reduces a low temperature region (quenched region) to a sufficiently small extent as in the homogeneous combustion mode. Because the lean background region acts to leave behind an excess of oxygen after the main combustion, the residual oxygen in the lean region is so hot as to promote the re-combustion of CO at the end of the main combustion.

Preferably, the fuel injection quantity of the first portion is equal to or larger than that of the second portion for keeping a balance between the amount of the products of incomplete combustion (such as CO) and the amount of oxygen left behind after the main combustion to effectively increase the temperature of the catalytic converter.

According to the present invention, the parameter that affects the engine torque can be the ignition timing, the fuel injection timing, and the fuel injection quantity, for example.

It is desirable that the ignition timing while the stratified combustion mode is maintained (i.e. the target ignition timing in the stratified combustion mode) be retarded more than the ignition timing while the homogeneous combustion mode is maintained in order for increasing the product of incomplete combustion and thus raising the exhaust gas temperature.

In the case of adjusting the ignition timing as the parameter that affects the engine torque, the controller may gradually adjust said ignition timing from an occurrence of a request for converting said combustion mode until said combustion mode is converted in one direction, adjust said ignition timing in the other direction to reduce said change of said engine torque at the same time the combustion mode is converted, and gradually adjust said ignition timing after said combustion mode is converted in the same direction before said combustion mode is converted.

When the controller converts the homogeneous combustion mode to the stratified stoichiometric combustion mode, there is a request for increasing the engine torque in order to prevent the torque differentiation caused by converting to the stratified stoichiometric combustion mode that is of lower thermal efficiency than the homogeneous combustion mode. However, on operating the homogeneous combustion mode, the ignition timing is controlled to keep MBT (i.e. the Minimum spark advance of Best Torque) to achieve the desired fuel economy (or the engine stability), therefore the ignition timing cannot be advanced any more to increase the engine torque.

On the other hand, when the controller converts the stratified stoichiometric combustion mode to the homogeneous combustion mode, there is a request for decreasing the engine torque in order to prevent the torque differentiation caused by converting to the homogeneous combustion mode that is of higher thermal efficiency than the stratified stoichiometric combustion mode. However, on operating the stratified stoichiometric combustion mode, the ignition timing is controlled as much retarded as the engine can maintain the stable operation for promoting atomization and vaporization of the stratified air fuel mixture, therefore the operation of the engine becomes unstable if the ignition timing is retarded anymore, and it is substantially impossible to adjust the ignition timing in the retarding direction any more.

For this reason, in the case that the combustion mode is converted from the homogeneous combustion mode to the stratified combustion mode, the controller gradually retards the ignition timing before the combustion mode is converted. And in the case that the combustion mode is converted from the stratified combustion mode to the homogeneous combustion mode, the controller gradually advances the ignition timing before the combustion mode is converted. After the combustion mode is converted, the ignition timing is adjusted at the same time, in the opposite direction to the gradual adjustment mentioned above, in order to reduce the torque differentiation, and the ignition timing is gradually adjusted to the target amount in the present combustion mode in the same direction as before the combustion mode is converted.

In this manner, the torque differentiation can be sufficiently reduced, and the engine torque before and after the combustion mode is converted can be changed gradually.

Furthermore, the controller may adjust intake airflow rate to reduce a change of the engine torque caused by gradually adjusting the ignition timing. When the ignition timing gradually retards, the engine torque changes in the decreasing direction, thus the intake airflow rate is adjusted in the increasing direction to reduce the amount of decrease of the engine torque, and when the ignition timing gradually advances, the engine torque changes in the increasing direction, thus the intake airflow rate is adjusted in the decreasing direction to reduce the amount of increase of the engine torque.

In this manner, the change of the engine torque can be reduced as much as possible throughout the process from the time when the controller permits conversion of the combustion mode until the ignition timing converges on the target ignition timing and the engine is brought into the stationary state after the combustion mode has been converted.

To adjust the intake air flow rate, an intake system of the internal combustion engine may comprise an intake passage connected to the internal combustion engine, a throttle valve disposed in the intake passage for controlling intake airflow rate, a throttle controller for electrically controlling the opening degree of the throttle valve, and for adjusting the intake airflow rate in response to the controller gradually adjusting the ignition timing.

On operating the stratified combustion mode, fuel injection quantity ratio of the first portion to the second portion may be set to be increased near an engine operating condition in which a conversion to the homogeneous combustion mode is permitted, so that the fuel injection quantity ratio is set larger relative to being in the engine operating condition far from which the conversion to the homogeneous combustion mode is permitted.

In this manner, the torque differentiation can be reduced because the ratio of the homogeneous air fuel mixture to the whole in the combustion chamber increases, and the combustion mode can be converted to the homogeneous combustion mode from the stratified combustion mode that increases its homogeneity. Therefore it makes it easy to convert the combustion mode, and makes it possible to shorten the time that it takes to gradually adjust the ignition timing before and/or after the combustion mode is converted so that the combustion mode can be converted quickly.

In the case of adjusting the fuel ignition timing as the parameter that affects the engine torque, it is easy to decrease the torque differentiation. Specifically, the controller may gradually advance the fuel injection timing from an occurrence of the request until the combustion mode has converted in a case of converting the stratified combustion mode to the homogeneous combustion mode, and in a case of converting the homogeneous combustion mode to the stratified combustion mode, adjusts the fuel injection timing in the advancing direction when the combustion mode is converted, then gradually retards the fuel injection timing.

When the stratified combustion mode is converted to the homogeneous combustion mode, the controller gradually advances the fuel injection timing on the compression stroke, so that the intake air quantity that can be mixed with fuel in the combustion chamber increases, hence the degree of homogeneity of the air fuel mixture increases. The higher the degree of homogeneity of the stratified combustion, the closer the stratified combustion mode comes to the homogeneous combustion mode, and the more the engine torque increases. Therefore the controller can reduce the torque differentiation and bring the engine torque to change gradually before the conversion of the combustion mode because the combustion mode is converted after the engine torque is gradually increased.

In the case of adjusting the fuel ignition quantity as the parameter that affects the engine torque, it can easily decrease the torque differentiation. Specifically, in a case of converting the stratified combustion mode to the homogeneous combustion mode, the controller gradually increases the fuel injection quantity from an occurrence of the request until the combustion mode has been converted, then adjusts the fuel injection quantity in the decreasing direction to an amount without adjustment when the combustion mode is converted, and in a case of converting the homogeneous combustion mode to the stratified combustion mode, adjusts the fuel injection quantity in the increasing direction when the combustion mode is converted, then gradually decreases the fuel injection quantity to an amount without adjustment.

In this manner, when the stratified combustion mode is converted to the homogeneous combustion mode, the controller gradually increases the fuel injection quantity, so that the engine torque can gradually increase before the combustion mode is converted. Therefore the controller can reduce the torque differentiation and bring the engine torque to change gradually before the combustion mode is converted.

In the present invention, as far as only the reduction of the torque differentiation is concerned, the controller may adjust the fuel injection quantity only once when it converts the combustion mode. However, the controller may gradually adjust the fuel injection quantity before or after the combustion mode is converted (as mentioned above), so that the controller can control the fuel injection quantity at the same amount between the homogeneous combustion mode and stratified stoichiometric combustion mode at the same engine operating condition and the air fuel ratio can be maintained the stoichiometric ratio ($\lambda=1$) in order to maintain the performance of purifying the exhaust gas.

In adjusting the fuel injection quantity, it may be the fuel injection quantity on the intake stroke and/or on the compression stroke that is gradually adjusted in the stratified stoichiometric combustion mode.

Furthermore, it may be the fuel injection quantity in the homogeneous combustion mode that the controller adjusts. Specifically, the controller adjusts the fuel injection quantity in the decreasing direction when the combustion mode is converted, then gradually increases the fuel injection quantity to an amount without adjustment, in a case of converting the stratified combustion mode to the homogeneous combustion mode, and in a case of converting the homogeneous combustion mode to the stratified combustion mode, gradually decreases the fuel injection quantity from an occurrence of the request until the combustion mode has converted.

In the manner mentioned above, when the controller converts the homogeneous combustion mode to the stratified stoichiometric combustion mode, the controller gradually adjusts the fuel injection quantity in the decreasing direction from the amount determined from the engine operating conditions by an amount so that the controller can reduce the torque differentiation when the combustion mode is converted, and then it converts to the stratified stoichiometric combustion mode. The fuel injection quantity is controlled according to the engine operating conditions in the stratified stoichiometric combustion mode when and after the combustion mode is converted thereto.

In converting the stratified stoichiometric combustion mode to the homogeneous combustion mode, the controller takes the process described above in the opposite direction. That is, just after the combustion mode is converted to the homogeneous combustion mode, the controller decreases the fuel injection quantity at once by an amount such that the torque differentiation can be canceled, and then, it gradually increases the fuel injection quantity to the amount determined from the engine operating condition in the homogeneous combustion mode (for example, the amount by which the air fuel ratio can be maintained at the theoretical air fuel ratio ($\lambda=1$)).

In this manner, it is also possible to reduce the torque differentiation when the combustion mode is converted, by decreasing the fuel injection quantity in the homogeneous combustion mode.

Further objects, features and advantages of the present invention will become apparent from the Detailed Description of Preferred Embodiments which follows when read in light of the accompanying figures.

DETAILED DESCRIPTION OF THE PREFERED EMBODIMENTS

Hereinafter, the present invention is described in detail with reference to the attached drawings.

Figure 1:
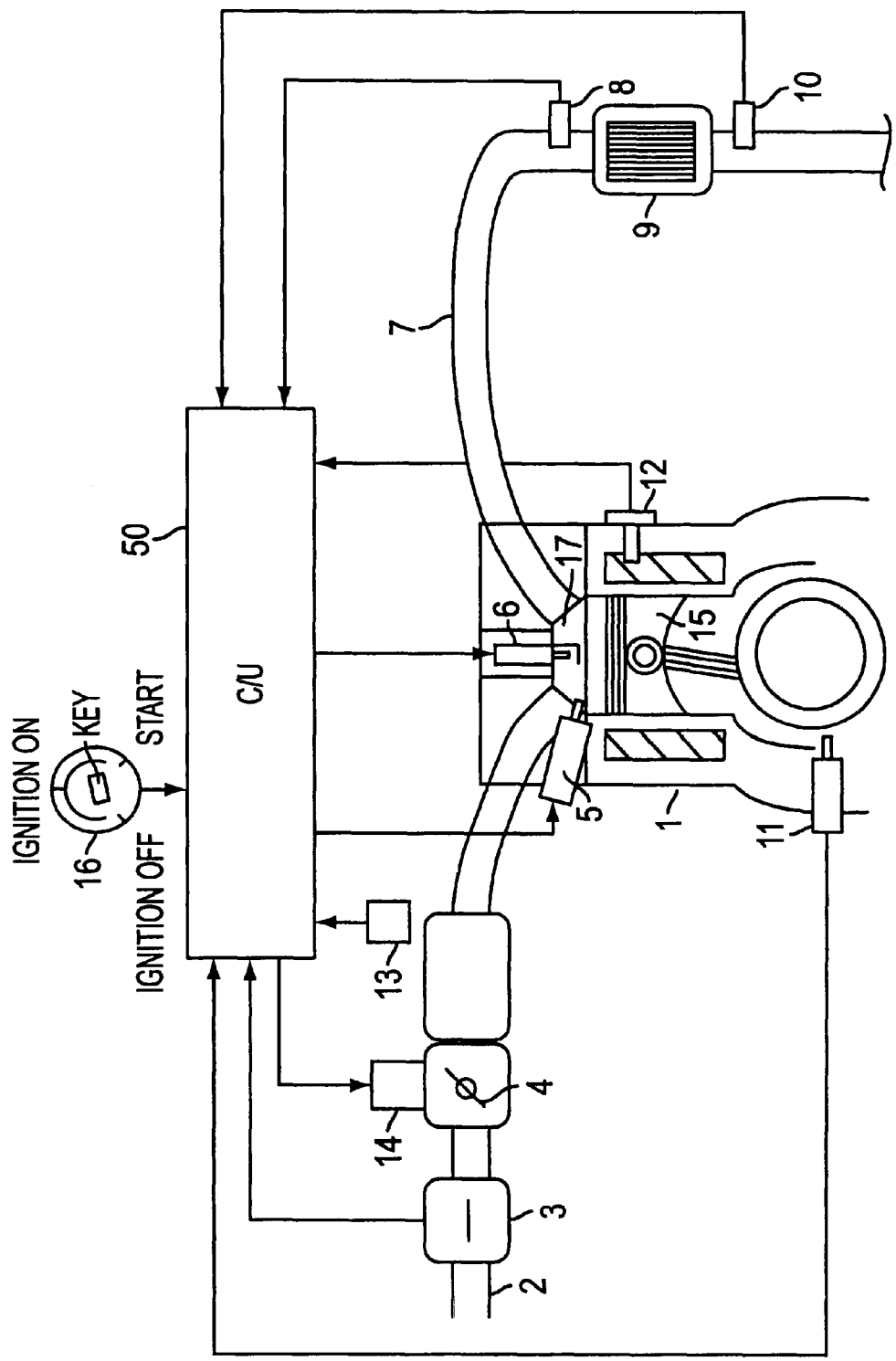
FIG. 1 is a schematic view showing a system of a spark-ignited direct injection engine and an engine controller according to a first embodiment of the present invention.

FIG. 1 shows a control system for a spark-ignited direct fuel injection internal combustion engine according to a first embodiment of the present invention.

An engine 1 is a spark-ignited direct fuel injection internal combustion engine having a combustion chamber 17 in each cylinder.

An intake system for the engine 1 comprises an intake passage 2. The intake passage 2 has therein an airflow meter 3 and a throttle valve 4. The airflow meter 3 senses an intake airflow rate Qa. The throttle valve 4 controls the intake airflow rate Qa.

A fuel system comprises fuel injectors 5 each provided for a corresponding cylinder of the engine 1. The injector 5 of each cylinder injects fuel directly into the combustion chamber 17 under the control of a drive pulse signal supplied from a control unit 50, as a controller of the present invention. The fuel system further has a fuel pump (not shown) for supplying the fuel under pressure and a pressure regulator (not shown) for regulating the pressure of the fuel supplied to the fuel injectors 5 at a controlled level.

An ignition plug 6 is provided for each cylinder. Each ignition plug 6 ignites the air fuel mixture in the combustion chamber 17 in response to an ignition control signal delivered from the control unit 50.

An exhaust system comprises an exhaust passage 7. An air fuel ratio sensor 8 is provided in the exhaust passage 7. The air fuel ratio sensor 8 senses the air fuel ratio of the exhaust gas mixture and hence the air fuel ratio of the intake gas mixture, by sensing the content of a predetermined substance such as oxygen in the exhaust gas mixture. The air fuel ratio sensor may be an oxygen sensor for producing an output signal indicating rich side or lean side, or may be a wide range air fuel ratio sensor capable of sensing the air fuel ratio linearly over a wide range.

An exhaust emission control device 9 for purifying the exhaust emission is disposed in the exhaust passage 7 at a location on the downstream side of the air fuel ratio sensor 8. The exhaust emission control device 9 of this embodiment is a catalytic converter, which can employ a three-way catalyst capable of oxidizing CO and HC and reducing NOx in the exhaust gas mixture efficiently at or near the stoichiometric air fuel ratio $\{\lambda=1$, or A/F (a mass ratio of air to fuel)$\approx 14.7\}$, and/or an oxidizing catalyst capable of oxidizing CO and HC.

A downstream-side oxygen sensor 10 is disposed in the exhaust passage 7, on the downstream side of the catalytic converter 9. The downstream-side oxygen sensor 10 senses the oxygen content of the exhaust gas mixture and produces a sensor output signal indicative of rich side or lean side deviation.

The exhaust system of the embodiment shown in FIG. 1 employs a so-called duel air fuel ratio sensor system for performing a feedback air fuel ratio control in accordance with the output of the upstream side air fuel ratio sensor 8, and modifying the feedback air fuel ratio control in accordance with the output of the downstream-side oxygen sensor 10 to reduce control error due to degradation of the air fuel ratio sensor 8 or the like. However, it is optional to omit the downstream-side oxygen sensor 10 if the plain feedback of the air fuel ratio without modification suffices. It is further optional to omit both the air fuel ratio sensor 8 and the downstream-side oxygen sensor when the feedback control is not needed.

In this embodiment, there is further provided a crank angle sensor 11. The control unit 50 determines the engine revolution speed Ne by counting pulses of a unit crank angle signal produced by the crank angle sensor 11 in synchronism with the engine revolution to determine the count over a predetermined time interval, or by measuring a period of a reference crank angle signal produced by the crank angle sensor 11.

A water temperature sensor 12 is arranged to sense the temperature TW of cooling water in a water jacket of the engine 1.

A throttle sensor 13 senses an opening degree of the throttle valve 4. (The throttle sensor 13 can also serve as an idle switch.)

In this embodiment, a throttle control unit 14 is provided for varying the throttle opening of the throttle valve 4 with an actuator such as a DC motor.

The throttle control unit 14 of this embodiment is capable of controlling the throttle opening of the throttle valve 4 electronically in response to a drive signal supplied from the control unit 50 so as to achieve a demanded torque calculated in accordance with a driver's accelerator input such as an accelerator depression degree.

The control unit 50 (as the controller of the present invention) receives output signals of these sensors and other input devices and thereby collects input information on vehicle operating conditions. The control unit 50 of this embodiment includes, as a main component, a microcomputer having, for example, a CPU (Central Processing Unit as a processor of the present invention), ROM, RAM, A/D converters, and input/output interfaces, and is programmed as described below. In accordance with the operating conditions, the control unit 50 outputs command signals to control the throttle control unit 14, the fuel supply quantity (the fuel injection quantity) by controlling the fuel injectors 5, and the ignition timing of the ignition plugs 6.

The control unit 50 of this embodiment further outputs a command signal for controlling the fuel injection timing to change over a combustion mode between a stratified combustion mode and a homogeneous combustion mode in accordance with the vehicle operating conditions. In some predetermined operating conditions such as low and medium load conditions, the control unit 50 operates the engine in the stratified combustion mode by injecting fuel directly into the combustion chamber 17 on the compression stroke so as to produce a stratified combustible air fuel mixture closely around the ignition plug 6.

In another operating condition such as a high load condition above a predetermined engine load, the engine is operated in the homogeneous combustion mode; fuel is injected on the intake stroke so as to produce an air fuel mixture that is substantially homogeneous throughout the combustion chamber 17.

Figure 2:
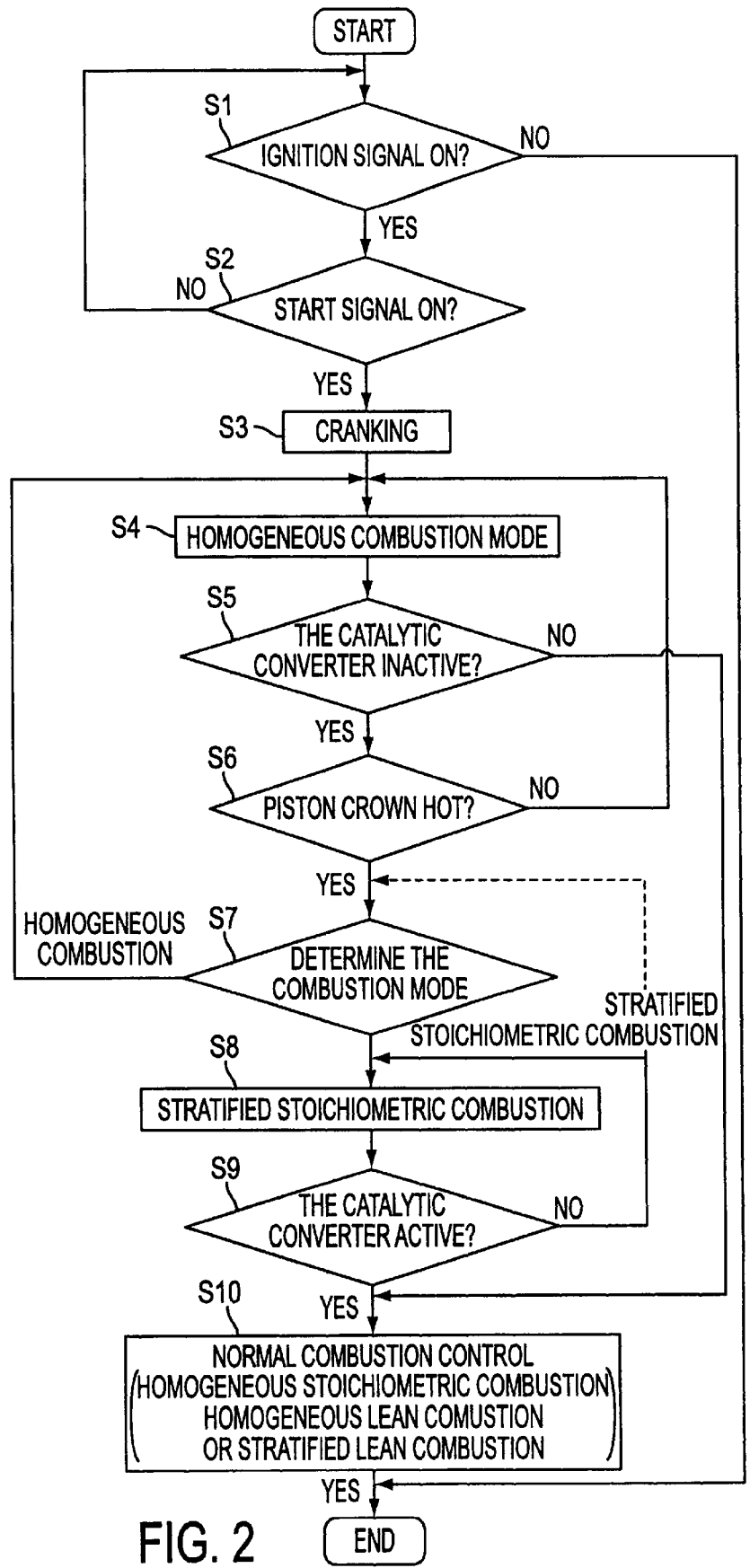
FIG. 2 is a flowchart showing a control process according to the first embodiment.

The control unit 50 according to this embodiment obtains various input signals from the sensors such as a vehicle key switch 16 and others, and performs a control process shown in FIG. 2 to reduce HC emission during a period from an engine start to activation of the catalytic converter 9, and to promote the activation of the catalytic converter 9. The control system of this embodiment is configured to operate the engine 1 in a first stratified combustion mode (such as a stratified lean combustion mode) and a second stratified combustion mode. In the second stratified combustion mode in an illustrated practical example, the average air fuel ratio in the combustion chamber 17 is set at the approximately stoichiometric ratio. Therefore, the second stratified combustion mode is referred to as a stratified stoichiometric combustion mode.

FIG. 2 shows a flowchart executed in this embodiment. The steps can be performed by hardware, software, or a combination of both. In general, the structure for carrying out the functions described below can include any type of processor, controller, or computer, appropriately programmed.

At a step S1 of FIG. 2, the control unit 50 checks whether an ignition signal of the key switch 16 turns on (i.e. whether a key is turned to an ignition on position shown in FIG. 1). Then, the control unit 50 proceeds to a step S2 in the case of YES, and terminates this flow in the case of NO.

At the step S2, the control unit 50 checks whether a start signal of the key switch 16 turns on (i.e. whether the key is turned to a start position shown in FIG. 1). Thus, the control unit 50 examines the existence or nonexistence of a request for cranking by a starter motor (not shown).

In the case of YES, the control unit 50 judges that there is a cranking request, and proceeds to a step S3. In the case of NO, the control unit 50 judges that there is no cranking request, and returns to the step S1.

At the step S3, the control unit 50 starts driving the starter motor and thereby cranks the engine 1.

Figure 4A:
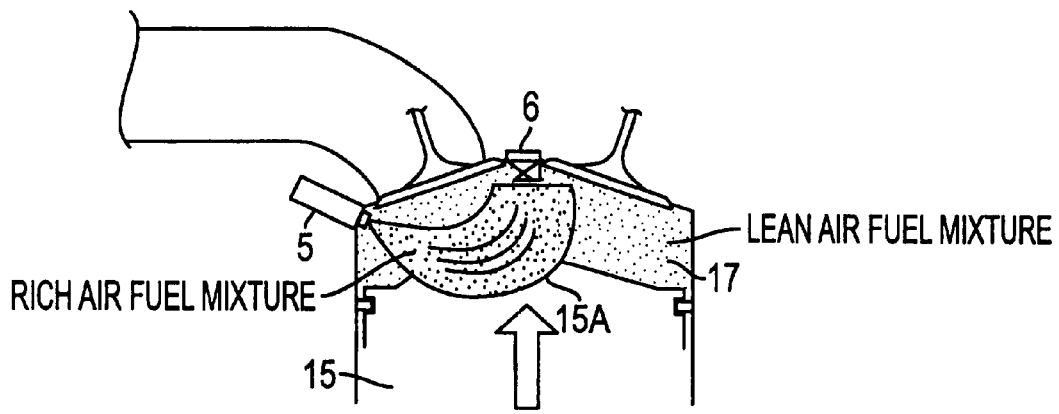
FIGS. 4A and 4B are schematic views for illustrating a direct fuel injection on the compression stroke and a direct fuel injection on the intake stroke, respectively.
Figure 4B:
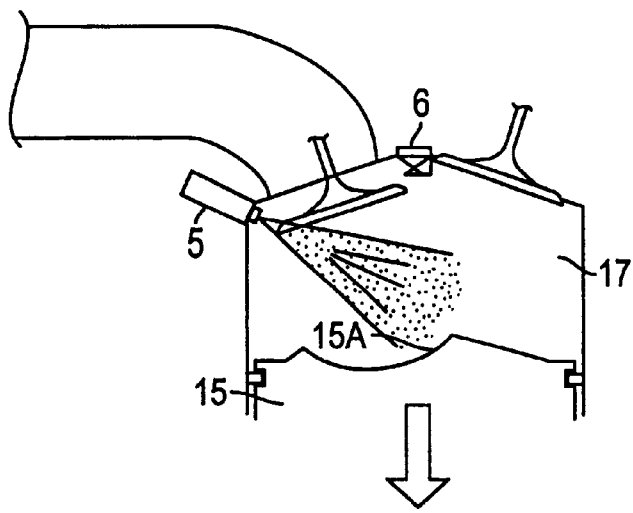
Figure 4C:
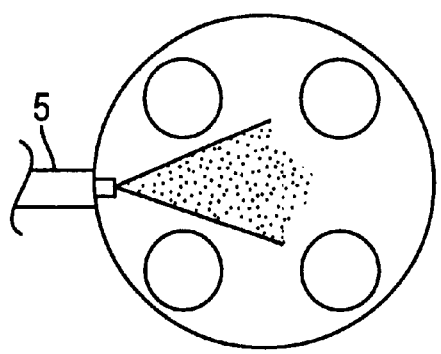
FIG. 4C is a plan view of FIG. 4B.

At a step S4, the control unit 50 commands the fuel injection system to perform fuel injections for starting (direct injections on the intake stroke, as shown in FIG. 4B), and operates the engine 1 (in the homogeneous combustion mode).

At a next step S5, the control unit 50 checks whether the catalytic converter 9 is still in an inactive state. In this embodiment, it is possible to check the activeness or inactiveness of the catalytic converter 9 by checking the activeness or inactiveness of the downstream-side oxygen sensor 10 because the time it takes to activate the catalytic converter 9 is nearly equal to that it takes to activate the downstream-side oxygen sensor 10. That is, the control unit 50 can judge the activeness or inactiveness of the catalytic converter 9 by monitoring the behavior of the output signal of the downstream-side oxygen sensor 10.

Moreover, it is possible to judge the active or inactive condition of the catalytic converter 9 by estimating the temperature (or the outlet temperature) of the catalytic converter 9 based on the detected value of the engine cooling water temperature Tw or the oil temperature, or alternatively measuring the temperature (or the outlet temperature) of the catalytic converter 9 with a temperature sensor.

When the catalytic converter 9 is in the active state and hence the answer of the step S5 is NO, then the control unit 50 proceeds to a step S10 assuming that there is no need for the catalyst activation control for promoting the activation of the catalytic converter 9. At the step S10, the control unit 50 controls the engine 1 in a normal combustion control mode to improve the fuel economy and other engine performances in accordance with operating conditions.

At a step S6, the control unit 50 checks whether the temperature of a piston 15 (specifically, a surface temperature in a bowl 15A formed in the piston crown as shown in FIGS. 4A and 4B) is equal to or higher than a predetermined temperature (a temperature for permitting transition to the stratified stoichiometric combustion mode). The decision at the step S6 can be performed by directly sensing the piston temperature with a thermocouple embedded in a predetermined portion (such as the piston crown) of the piston 15. Alternatively, the control system can estimate the piston temperature from the sensed engine cooling water temperature TW or the oil temperature, and determine the answer of the step S6 in accordance with the result of the estimation.

For example, the control unit 50 may determine a pseudo water temperature TWF correlated with the piston crown temperature, and examine whether the pseudo water temperature TWF is equal to or higher than a predetermined temperature TWF1 (a pseudo water temperature for permitting a transition to the stratified stoichiometric combustion mode). The pseudo water temperature TWF has the characteristic that it starts from an initial pseudo temperature determined in accordance with an initial engine cooling water temperature, and increases so as to converge toward the engine cooling water temperature TW, in a pace of first order lag by an amount per unit time. The amount per unit time by which the pseudo water temperature TWF increases is determined by the intake airflow rate Qa.

When the answer of the step S6 is YES, the control unit 50 judges that the operation of the stratified stoichiometric combustion mode for promoting the catalyst activation would not impair ignitability, combustibility and hence engine stability (drivability), and proceeds to a step S7.

When the answer of the step S6 is NO, the control unit 50 judges there is a possibility that the piston crown temperature is too low to satisfactorily promote atomization and vaporization of the stratified air fuel mixture and that operation of the stratified stoichiometric combustion mode would lower the ignitability, combustibility and engine stability (drivability), and returns to the step S4 to inhibit transition to the stratified stoichiometric combustion mode and instead to continue the injections on the intake stroke (i.e. in the homogeneous combustion mode).

Figure 3:
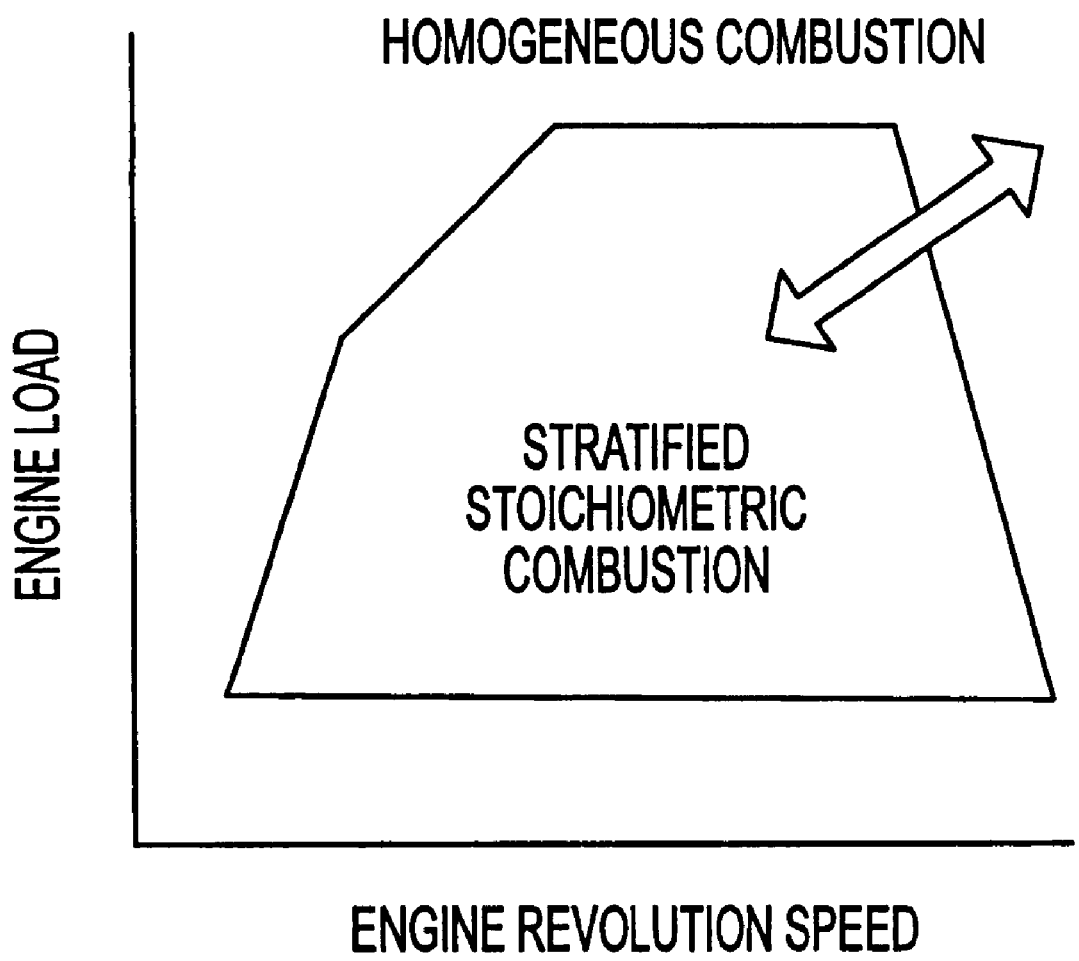
FIG. 3 is a graph according to the first embodiment showing a map used for selecting a combustion mode according to engine operating condition at a step S7 in FIG. 2.

As mentioned above, the control unit 50 proceeds to the step S7 when the catalytic converter 9 is inactive and there is a request for the catalyst activation control for promoting the activation of the catalytic converter 9, and when the piston crown temperature is equal to or higher than the predetermined temperature (hence the stratified air fuel mixture can be satisfactorily produced). However, some operating conditions, such as the engine 1 being in acceleration, require high output performance from engine 1. In such operating conditions, the control unit 50 gives priority to the output performance, and permits the homogeneous combustion mode. For example, the control unit 50 selects the combustion mode by looking up a map shown in FIG. 3, which is predetermined according to the engine revolution speed and the engine load. If the engine 1 is in the operating condition that the control unit 50 should permit the stratified stoichiometric combustion mode, the control unit 50 proceeds to a step S8, permits the transition to the stratified stoichiometric combustion mode for promoting the activation of the catalytic converter 9. If the engine 1 is in the operating condition that the control unit 50 should permit the homogeneous combustion mode, the control unit 50 returns to the step S4 and permits the homogeneous combustion mode.

At the step S8, the stratified stoichiometric combustion mode is operated after executing the process to reduce an undesired sudden change of the engine torque caused by converting the combustion mode (i.e. the torque differentiation), which is described later.

In this embodiment, the total per-cycle fuel quantity (by weight) required to achieve the most complete combustion of the fuel with the intake air quantity per combustion cycle and to obtain an approximately stoichiometric air fuel ratio (in other words, the theoretical air fuel ratio) is divided into a first portion of about 50% to about 90% used for the intake stroke injection, and a second portion of about 50% to 10% for the compression stroke injection.

The first portion (about 50%~about 90%) of the total per-cycle fuel quantity is injected into the combustion chamber 17 on the intake stroke so that a relatively lean (leaner-than-stoichiometric) homogeneous air fuel mixture is produced throughout the entirety of the combustion chamber 17. This intake stroke fuel injection is depicted in FIG. 4B.

The remaining about 50% to about 10% portion is injected on the compression stroke so as to produce a relatively rich (richer-than-stoichiometric) stratified air fuel mixture closely around the ignition plug 6 as shown in FIG. 4A.

Figure 5:
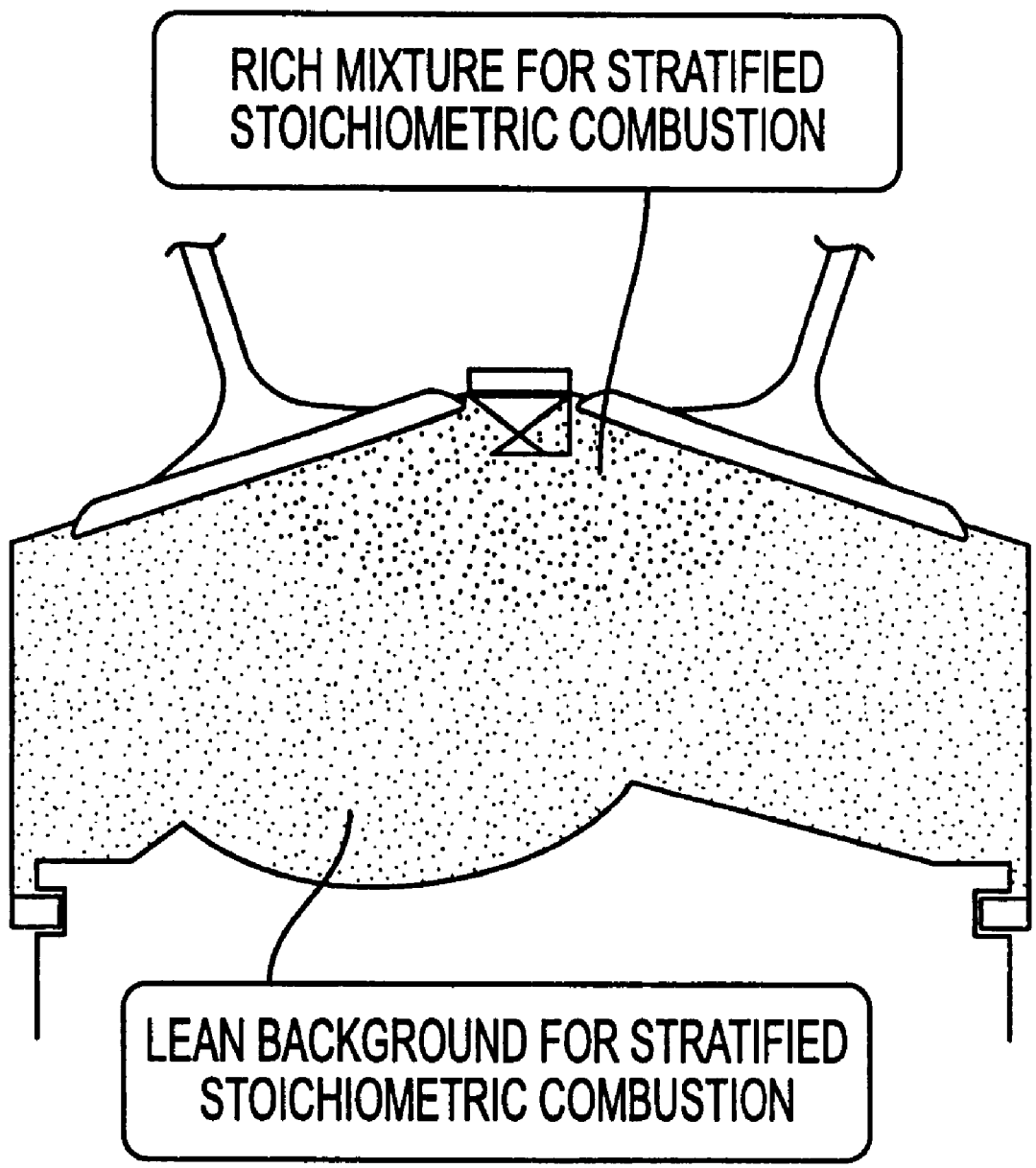
FIG. 5 is a schematic view for illustrating distribution of an air fuel mixture in a stratified stoichiometric combustion mode operated by the system of FIG. 1.

Then, the combustion takes place in the combustion chamber 17 in the state in which the richer region is formed around the ignition plug 6, in the leaner background as shown in FIG. 5.

In this stratified stoichiometric combustion mode, the shares of the first and second portions may be so determined that the air fuel ratio of the leaner-than-stoichiometric background mixture produced in the combustion chamber 17 during the intake stroke is 16~28, and that the air fuel ratio of the richer-than-stoichiometric mixture produced around the ignition plug 6 by the injection on the compression stroke is 9~13. As long as the air fuel ratios of each portion are set within these ranges, respectively, it is optional to set the average air fuel ratio in the combustion chamber 17 at a value (within a range of 13.8~18, for example) slightly deviant from the theoretical air fuel ratio. The average air fuel ratio range of 13.8~18 is effective in keeping a balance between the amount of the products of incomplete combustion (such as CO) and the amount of oxygen left behind after the main combustion to effectively increase the temperature of the catalytic converter. Especially when the average air fuel ratio is set substantially equal to the stoichiometric ratio, the amounts of CO and residual oxygen are approximately equivalent and the temperature of the catalytic converter increases very efficiently.

By operating the stratified stoichiometric combustion mode, the control system can increase the exhaust gas temperature as compared with the homogeneous stoichiometric combustion mode, and at the same time the control system can reduce the amount of unburned HC discharged from the combustion chamber 17 to the exhaust passage.

At a step S9, the control unit 50 checks whether the catalytic converter 9 is activated (the warm up operation is finished) or not, in the same manner as the step S5. The control unit 50 proceeds to the step S10 when the catalytic converter 9 is in the activated state and the answer of the step S9 is YES. When the answer of the step S9 is NO, the control unit 50 returns to the step S8 and continues the stratified stoichiometric combustion mode until the catalytic converter 9 becomes activated.

In this embodiment described above, the control unit 50 may return to the step S7, instead of S8, alternatively, as shown by dotted line in FIG. 2. In this case, the control unit 50 selects the combustion mode by looking up the map shown in FIG. 3 again. If the engine 1 is in the operating condition such that the control unit 50 should permit the homogeneous combustion mode, the control unit 50 returns to the step S4 and operates the homogeneous combustion mode even after the control unit 50 has started to operate the stratified stoichiometric combustion mode at the step S8.

At the step S10, the control unit 50 converts the combustion control mode to a normal combustion mode (such as homogeneous stoichiometric combustion mode, homogeneous lean combustion mode, and stratified lean combustion mode) to achieve desired emission performance, fuel efficiency or drivability (such as output performance, and stability) in accordance with the engine operating conditions, and then terminates the flow shown in FIG. 2. In this embodiment, just after the catalytic converter 9 is judged to be active at the step S9, the control unit 50 converts to the homogeneous combustion mode, preferably the homogeneous stoichiometric combustion mode in order to reduce the difference of the engine torque from the stratified stoichiometric combustion mode as much as possible.

In some engine operating conditions that may possibly affect the combustibility of the stratified stoichiometric combustion mode adversely (such as the condition in which the piston crown temperature is lower than a predetermined temperature), the control system of this embodiment inhibits the transition to the stratified stoichiometric combustion mode. That is, the control system of this embodiment gives higher priority to the engine stability (engine drivability) over quick activation of the catalytic converter 9. When the activation of the catalytic converter 9 is to take higher priority, it is possible to omit this arrangement (by omitting the step S6 in the flowchart shown in FIG. 2).

Figure 6:
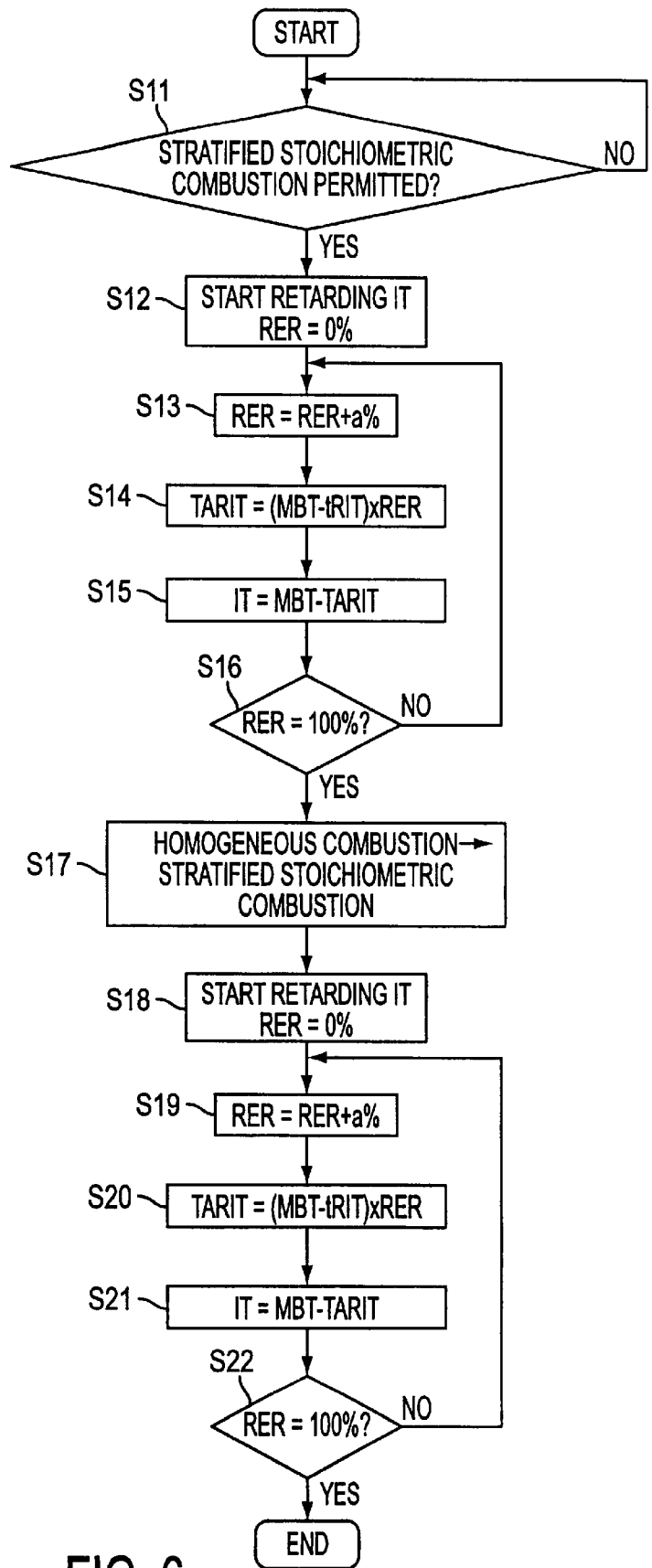
FIG. 6 is a flowchart according to the first embodiment showing a control process for converting the homogeneous combustion mode to the stratified stoichiometric combustion mode.

FIG. 6 is a flowchart regarding the first embodiment of the present invention, and shows a control process for reducing the torque differentiation when the combustion mode is converted from the homogeneous combustion mode to the stratified stoichiometric combustion mode.

At a step 11, the control unit 50 checks if there is permission for operating the stratified stoichiometric combustion mode (i.e. if the stratified stoichiometric combustion mode is selected at the step S7 in FIG. 2).

When the operation of the stratified stoichiometric combustion mode is permitted, or there is a request to convert the present homogeneous combustion mode to the stratified stoichiometric combustion mode to increase the exhaust gas temperature, the control unit 50 proceeds to a step S12, and controls the retardation amount of the ignition timing for reducing the torque differentiation, and initially sets a retardation ratio RER at 0%.

When the control unit 50 converts the homogeneous combustion mode to the stratified stoichiometric combustion mode, there is a request for increasing the engine torque in order to prevent the undesired decrease thereof (i.e. the torque differentiation) caused by converting to the stratified stoichiometric combustion mode that is of lower thermal efficiency than the homogeneous combustion mode. However, on operating the homogeneous combustion mode, the ignition timing is controlled to keep MBT (i.e. the Minimum spark advance of Best Torque) to achieve the desired fuel economy (or the engine stability), therefore the ignition timing cannot be advanced any more to increase the engine torque. Thus, the control unit 50 gradually retards the ignition timing before the combustion mode is converted. In this embodiment, by such a gradual retardation, the ignition timing reaches the value from which the control unit 50 adjusts the ignition timing to MBT in the stratified stoichiometric combustion mode at the same time the combustion mode is converted, in order to sufficiently reduce the torque differentiation.

At a step S13, the control unit 50 increments the retardation ratio RER by a predetermined value to gradually retard the ignition timing. Specifically, the control unit 50 increments the retardation ratio RER by a % (1%, for example) per a unit time (10 ms, for example).

At a step S14, the control unit 50 calculates a total amount of retardation of the ignition timing TARIT. At first, the control unit 50 determines a target retarded ignition timing tRIT according to the engine revolution speed and the engine load (such as a basic fuel injection quantity Tp, for instance) by looking up a predetermined map so that the torque differentiation can be sufficiently reduced by advancing the ignition timing from the target retarded ignition timing tRIT to MBT in the stratified stoichiometric combustion mode at the same time the combustion mode is converted. And then, the control unit 50 calculates a present total amount of retardation TARIT by the following formula:

$$TARIT=(MBT-tRIT)*RER$$

At a step S15, the control unit 50 finally determines the ignition timing IT by the following formula:

$$IT=MBT-TARIT$$

Figure 7:
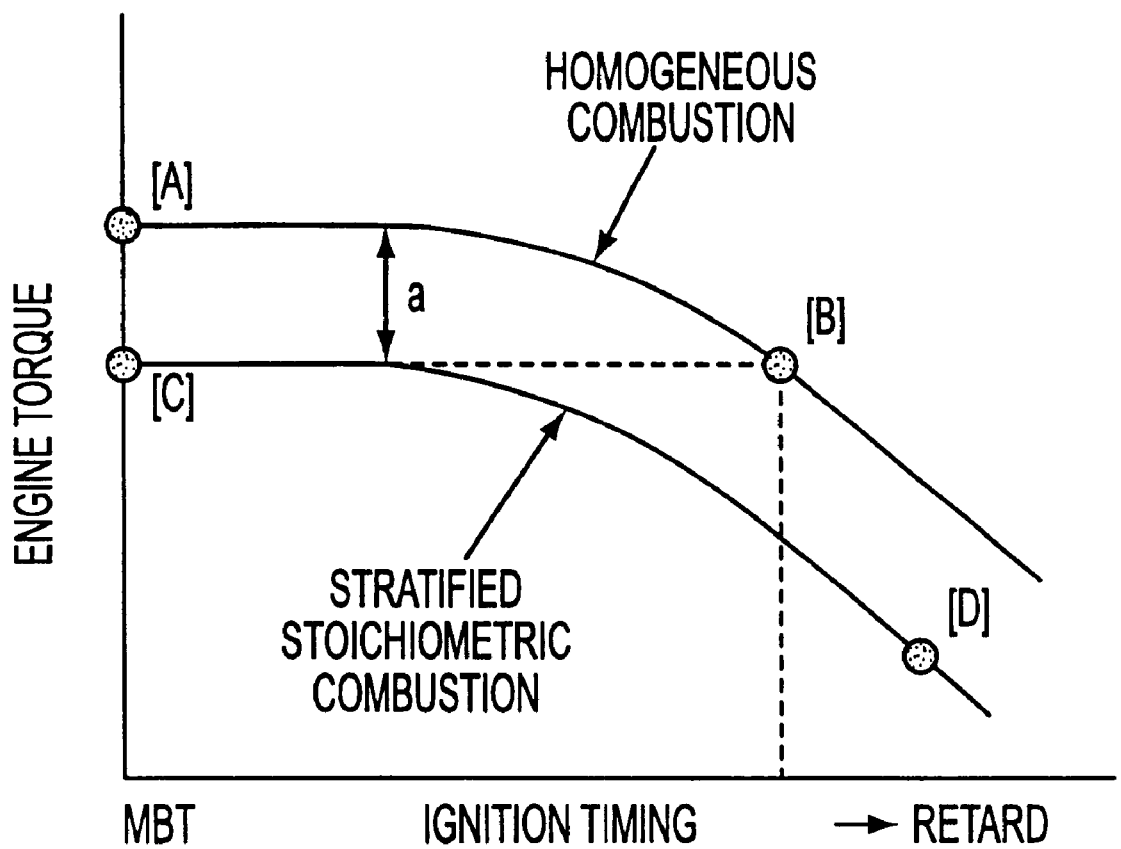
FIG. 7 is a graph according to the first embodiment showing changes of ignition timing and engine torque when combustion mode is converted.

In the manner described above, the control unit 50 gradually retards the ignition timing to the target retarded ignition timing tRIT after the control unit 50 permits conversion of the combustion mode (as shown in FIG. 7, [A]→[B]).

At a step S16, the control unit 50 checks whether the ignition timing IT reaches the target retarded ignition timing tRIT, by checking whether the retardation ratio RER reaches 100%, for instance. If the ignition timing IT has not reached the target retarded ignition timing tRIT yet, the control unit 50 returns to the step S13, and increments the retardation ratio RER.

When the control unit 50 judges that the ignition timing IT has reached the target retarded ignition timing tRIT, it proceeds to a step S17, converts the homogeneous combustion mode to the stratified stoichiometric combustion mode. As described at the step S7 in FIG. 2, the control unit 50 switches the injection mode of the fuel system from the injection on the intake stroke to that on the intake and compression strokes (i.e. the divided injection), so that the control unit 50 can convert the combustion mode to the stratified stoichiometric combustion mode.

Figure 8:
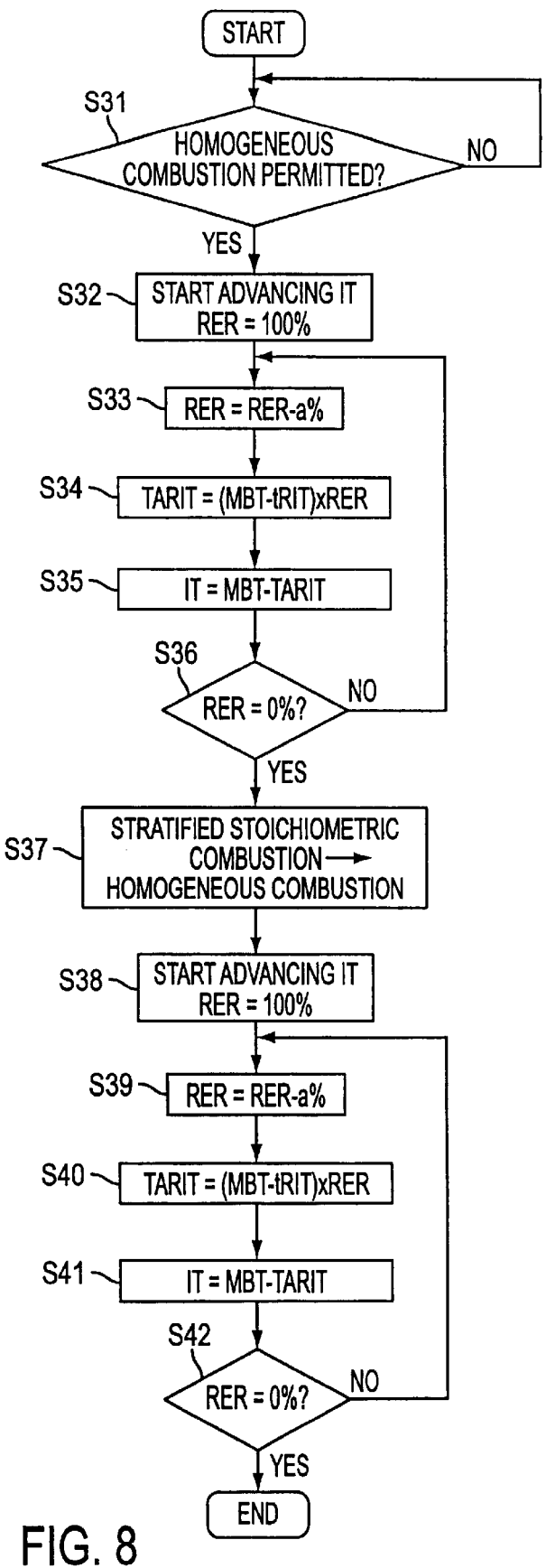
FIG. 8 is a flowchart according to the first embodiment showing a control process for converting the stratified stoichiometric combustion mode to the homogeneous combustion mode.

Then, the control unit 50 proceeds to a step S18, sets the retardation ratio at 0%, thereby the ignition timing returns to MBT, which is the value before the control unit 50 starts retarding the ignition timing (as shown in FIG. 8, [B]→[C]). In that manner, the control unit 50 adjusts the ignition timing as much as the total amount of retardation in the advance direction at once, and thereby prevents the occurrence of the torque differentiation (which is shown as 'a' in FIG. 7). Thus, stable drivability is achieved.

At a step S19 and later, the control unit 50 gradually brings the ignition timing close to an optimum target ignition timing in the stratified stoichiometric combustion mode after the conversion thereto.

At first, at a step S19, the control unit 50 increments the retardation ratio RER by a predetermined value. Specifically, in the same manner as at the step S13, the control unit 50 increments the retardation ratio RER by a % (1%, for example) per a unit time (10 ms, for example).

And at a step S20, the control unit 50 calculates the present total amount of retardation of the ignition timing TARIT. To do that, the control unit 50 determines a target retarded ignition timing tRIT in the stratified stoichiometric combustion mode according to the engine revolution speed and the engine load (such as the basic fuel injection quantity Tp, for instance) by looking up a predetermined map, and calculates a present total amount of retardation TARIT by the following formula:

$$TARIT=(MBT-tRIT)*RER$$

In this case, the target retarded ignition timing tRIT in the stratified stoichiometric combustion mode is set as much retarded as the engine 1 can maintain the stable operation (or drivability). In that manner, the exhaust gas temperature can be raised as high as possible. However, the ignition timing may be retarded to the degree that the engine 1 can maintain the stable operation equivalent to that operated in the conventional combustion mode, and even in such a manner, the ignition timing can be much more retarded in the stratified stoichiometric combustion mode than in the conventional combustion mode, therefore the exhaust gas temperature can be raised much higher.

At a step S21, the control unit 50 finally determines the ignition timing IT by the following formula:

$$IT=MBT-TARIT$$

Thus, the ignition timing is gradually retarded and brought close to the target retarded ignition timing tRIT in the stratified stoichiometric combustion mode after the control unit 50 converts the combustion mode thereto (as shown in FIG. 7, [C]→[D]).

At a step S22, the control unit 50 checks if the ignition timing IT reaches the target retarded ignition timing tRIT, by checking if the retardation ratio RER reaches 100%, for instance. If the ignition timing IT has not reached the target retarded ignition timing tRIT yet, the control unit 50 returns to the step S19, and increments the retardation ratio RER.

In the manner described above, the torque differentiation can be reduced when the control unit 50 converts the homogeneous combustion mode for starting the engine to the stratified stoichiometric combustion mode for raising the exhaust gas temperature.

FIG. 8 is a flowchart showing the control process for adjusting the ignition timing when the combustion mode is converted from the stratified stoichiometric combustion mode to the homogeneous combustion mode.

At a step S31, the control unit 50 checks if there is a permission for operating the homogeneous (stoichiometric) combustion mode (i.e. when the homogeneous combustion mode is selected at the step S10 in FIG. 2, or at the step S7, in the case that the control unit 50 returns to the step S7 when the answer at the step S9 is NO, as mentioned above).

When the homogeneous combustion mode is permitted, in other words, there is a request to convert the present stratified stoichiometric combustion mode to the homogeneous combustion mode because the catalytic converter 9 has finished its warm-up and is thereby sufficiently activated, or because the operating condition of the engine 1 has been out of the region where the stratified stoichiometric combustion mode is permitted in the case of acceleration and so on, and the control unit 50 proceeds to a step S32, and controls the advance of the ignition timing for reducing the torque differentiation.

At this time, the control unit 50 initially sets the retardation ratio RER at 100%.

When the control unit 50 converts the stratified stoichiometric combustion mode to the homogeneous combustion mode, there is a request for decreasing the engine torque in order to prevent the undesired increase thereof (i.e. the torque differentiation) caused by converting to the homogeneous combustion mode that is of higher thermal efficiency than the stratified stoichiometric combustion mode. However, on operating the stratified stoichiometric combustion mode, the ignition timing is controlled as much retarded as the engine 1 can maintain the stable operation, therefore the operation of the engine 1 becomes unstable if the ignition timing is retarded any more, and it is substantially impossible to adjust the ignition timing in the retarding direction any more. For that reason, the control unit 50 gradually advances the ignition timing before the combustion mode is converted. In this embodiment, by such a gradual advance, the ignition timing reaches MBT in the stratified stoichiometric combustion mode, which is the value from which the control unit 50 adjusts the ignition timing to tRIT in the homogeneous combustion mode at the same time the combustion mode is converted, in order to sufficiently reduce the torque differentiation.

At a step S33, the control unit 50 decrements the retardation ratio RER by a predetermined value to gradually advance the ignition timing. Specifically, the control unit 50 decrements the retardation ratio RER by a % (1%, for example) per a unit time (10 ms, for example).

At a step S34, the control unit 50 calculates the total amount of retardation of the ignition timing TARIT. At first, the control unit 50 determines MBT in the homogeneous combustion mode to which the combustion mode is converted, according to the engine revolution speed and the engine load (such as the basic fuel injection quantity Tp, for instance) by looking up a predetermined map, and then, calculates the present total amount of retardation TARIT according to MBT determined above and the present ignition timing, or the target retarded ignition timing, by the following formula:

$$TARIT=(MBT-tRIT)*RER$$

At a step S35, the control unit 50 finally determines the ignition timing IT by the following formula:

$$IT=MBT-TARIT$$

In the manner described above, the control unit 50 gradually advances the ignition timing to MBT after the control unit 50 permits conversion of the combustion mode (as shown in FIG. 7, [D]→[C]).

At a step S36, the control unit 50 checks whether the ignition timing IT reaches MBT, by checking whether the retardation ratio RER reaches 0%, for instance. If the ignition timing IT has not reached MBT yet, the control unit 50 returns to the step S33, and decrements the retardation ratio RER.

When the control unit 50 judges that the ignition timing IT has reached MET, it proceeds to a step S37, converts the stratified stoichiometric combustion mode to the homogeneous combustion mode. In other words, the control unit 50 switches the injection mode of the fuel system to the injection on the intake stroke in order to produce the homogeneous air fuel mixture.

At this time, the control unit 50 adjusts the ignition timing to a predetermined value equivalent to the amount that the torque differentiation can be canceled (i.e. to the target retarded ignition timing tRIT in the homogeneous combustion mode) in the retarding direction at once, (as shown in FIG. 7, [C]→[B]). In this manner, the control unit 50 can prevent the occurrence of the torque differentiation, and thus achieve the stable operation of the engine 1.

At a step S38 and later, the control unit 50 gradually brings the ignition timing close to MBT in the homogeneous combustion mode after the conversion thereto.

At first, at a step S39, the control unit 50 decrements the retardation ratio RER by a predetermined value. Specifically, in the same manner as at the step 33, the control unit 50 decrements the retardation ratio RER by a % (1%, for example) per a unit time (10 ms, for example).

And at a step S40, the control unit 50 calculates the present total amount of retardation of the ignition timing TARIT according to MBT in the homogeneous combustion mode and the target retarded injection timing tRIT just after the combustion mode is converted by the following formula:

$$TARIT=(MBT-tRIT)*RER$$

At a step S41, the control unit 50 finally determines the ignition timing IT by the following formula:

$$IT=MBT-TARIT$$

Thus, the ignition timing is gradually advanced and brought close to MBT in the homogeneous combustion mode after the control unit 50 converts the combustion mode thereto (as shown in FIG. 7, [B]→[A]).

At a step S42, the control unit 50 checks whether the ignition timing IT reaches MBT, by checking whether the retardation ratio RER reaches 0%, for instance. If the ignition timing IT has not reached MBT yet, the control unit 50 returns to the step S39, and decrements the retardation ratio RER.

In the manner described above, the torque differentiation can be reduced when the control unit 50 converts the stratified stoichiometric combustion mode for raising the exhaust gas temperature to the homogeneous combustion mode for starting the engine.

According to the first embodiment described above, the change of the engine torque can be made smoothly because the control unit 50 gradually adjusts the ignition timing from the time when the control unit 50 permits conversion of the combustion mode until the combustion mode is actually converted, and while the control unit 50 is bringing the ignition timing close to the target value after the combustion mode has been converted.

Furthermore, according to the first embodiment, the control unit 50 adjusts the intake air quantity to reduce such a gradual change of engine torque. The control for adjusting the intake airflow rate when the combustion mode is converted is described with reference to a flowchart shown in FIG. 9 and a timing chart shown in FIG. 10. In this embodiment, an adjustment value of the intake airflow rate ADJQA is defined as the increased amount of the intake airflow rate to add to the basic intake airflow rate defined as the intake airflow rate at the time when the injection timing is set at MBT in the homogeneous combustion mode. For example, when the control unit 50 advances the injection timing, the control unit 50 adjusts the intake airflow rate in the direction of decreasing it in order to reduce the engine torque. In that case, the control unit 50 decreases the adjustment value of the intake airflow rate ADJQA.

Figure 9:
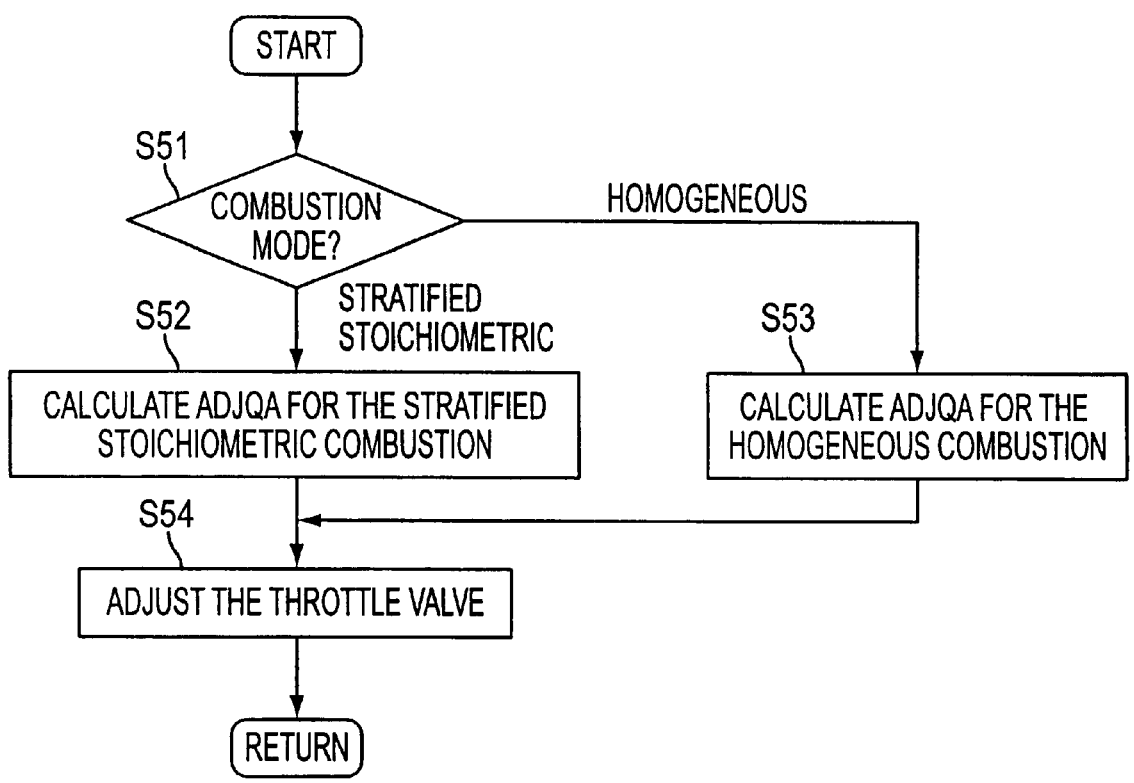
FIG. 9 is a flowchart according to the first embodiment showing a control process for adjusting intake airflow rate to reduce torque differentiation, which accompanies a transition of the combustion mode.

At a step S51 shown in FIG. 9, the control unit 50 checks which combustion mode is operated, the homogeneous combustion mode or the stratified stoichiometric combustion mode.

When the control unit 50 judges that the homogeneous combustion mode is operated, it proceeds to a step S53, and calculates the adjustment value of the intake airflow rate ADJQA according to the total amount of retardation of the injection timing TARIT, which is defined as the amount of retardation from MBT (as shown at the step S14 in FIG. 6) in the homogeneous combustion mode before the control unit 50 converts to the stratified stoichiometric combustion mode, so that the control unit 50 can reduce the decrease of the engine torque caused by retarding the injection timing from MBT.

It is convenient to calculate the adjustment value of the intake airflow rate ADJQA proportionally to the total amount of retardation of the injection timing TARIT, using the following formula:

$$ADJQA \text{ [Liter/min]}=TARIT \text{ [deg]}*kQA \text{ [Liter/min/deg]}$$

In the formula described above, kQA is a proportional coefficient.

When the control unit 50 judges that the stratified stoichiometric combustion mode is operated, it proceeds to a step S52, and calculates the adjustment value of the intake airflow rate ADJQA according to the summed amount of retardation of the injection timing SARIT, which is defined as a summation of the total amount of retardation of the injection timing TARIT from MBT in the homogeneous combustion mode and another total amount of retardation of the injection timing TARIT from MBT in the stratified stoichiometric combustion mode, so that the adjustment value of the intake airflow rate ADJQA can be calculated based on the intake airflow rate at MBT in the homogeneous combustion mode. For example, after the combustion mode is converted to the stratified stoichiometric combustion mode as shown in FIG. 5, the control unit 50 calculates the summed amount of retardation of the injection timing SARIT by adding the total amount of retardation of the ignition timing TARIT calculated at the step S14 in FIG. 6 at the time when the retardation ratio RER is set at 100%, to the present total amount of retardation of the ignition timing TARIT calculated at the step S20. In the case of FIG. 8 when the stratified stoichiometric combustion mode is operated before the combustion mode is converted to the homogeneous combustion mode, the control unit 50 calculates the summed amount of retardation of the injection timing SARIT by adding the total amount of retardation of the ignition timing TARIT calculated at the step S14 in FIG. 6 when the retardation ratio RER is set at 100%, to the present total amount of retardation of the ignition timing TARIT calculated at the step S34 in FIG. 8.

The control unit 50 calculates the adjustment value of the intake airflow rate ADJQA proportionally to the summed amount of retardation of the injection timing SARIT, using the following formula:

$$ADJQA \text{ [Liter/min]}=SARIT \text{ [deg]}*kQA\text{[Liter/min/deg]}$$

In the formula described above, kQA is the proportional coefficient.

The adjustment value of the intake airflow rate ADJQA also may be calculated by summing the adjustment value of the intake airflow ADJQA calculated just before the combustion mode is converted to the stratified stoichiometric combustion mode and another adjustment value of the intake airflow rate ADJQA calculated according to the total amount of retardation of the ignition timing TARIT in the stratified stoichiometric combustion mode.

At a step S54, the control unit 50 commands the throttle control unit 14 to adjust the opening degree of the throttle valve 4 according to the adjustment value of the intake airflow rate ADJQA calculated in the manner described above.

In this manner, the change of the engine torque can be reduced throughout the process from the time when the control unit 50 permits conversion of the combustion mode until the ignition timing converges on the target ignition timing and the engine 1 is brought into the steady state after the combustion mode has been converted, and therefore the stable drivability can be achieved as much as possible.

Figure 10:
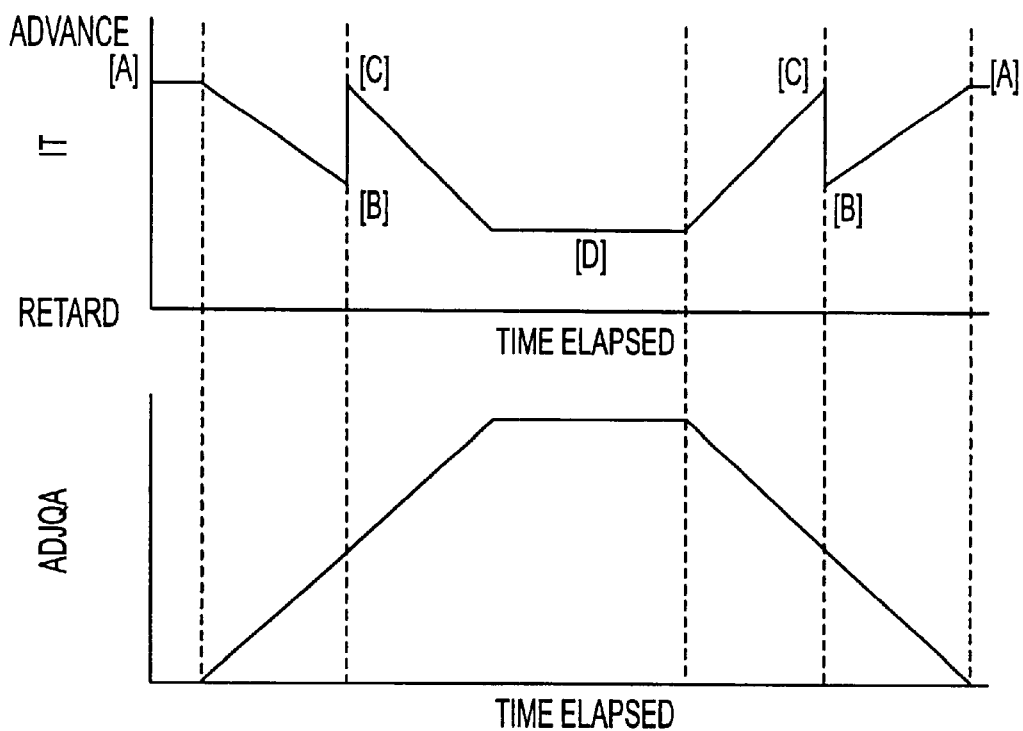
FIG. 10 is a time chart according to the first embodiment showing a change of an adjustment value of the intake airflow rate ADJQA relative to a change of ignition timing IT.

A change of the adjustment value ADJQA according to the ignition timing IT is shown in FIG. 10, throughout a process in which the combustion mode is converted. [A], [B], [C], and [D] in FIG. 10 correspond to those in FIG. 7 respectively. It can be seen that the adjustment value ADJQA increases throughout the process from the beginning of retardation in the homogeneous combustion mode [A] until the ignition timing reaches the target retarded ignition timing tRIT in the stratified stoichiometric combustion mode [D], and that the adjustment value ADJQA decreases throughout the process from the beginning of advance in the stratified stoichiometric combustion mode [D] until the ignition timing returns to MBT in the homogeneous combustion mode [A].

In the manner mentioned above, the control unit 50 can reduce a gradual change of the engine torque due to the gradual adjustment of the ignition timing. On the other hand, an adjustment of the intake airflow rate may be made for reducing a part of the torque differentiation that cannot be reduced by the adjustment of the ignition timing at the same time the combustion mode is converted.

Figure 11:
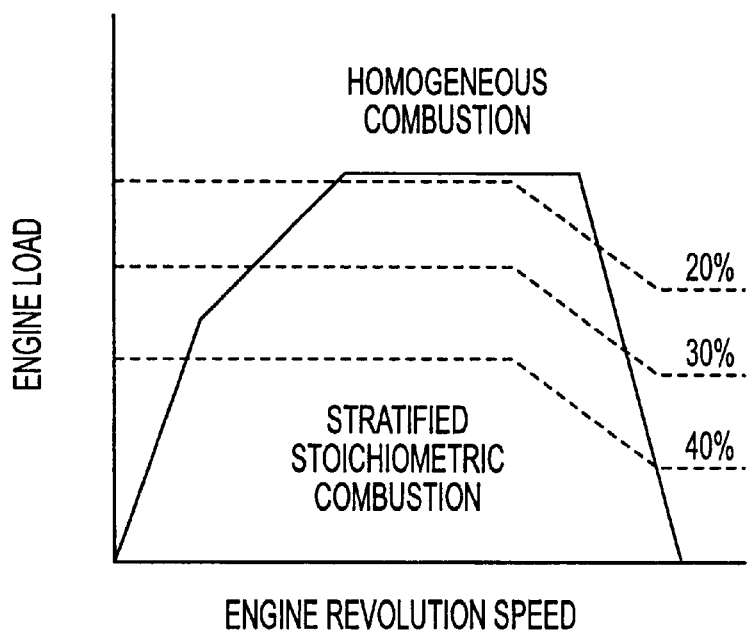
FIG. 11 is a graph according to the first embodiment showing the deviation ratio of fuel quantity injected on compression stroke to the whole, according to engine operating condition.

As already mentioned regarding the first embodiment, in the stratified stoichiometric combustion mode, the control unit 50 divides the fuel injection into two portions, one is injected on the intake stroke and the other on the compression stroke. In this embodiment, the control unit 50 increases the fuel injection quantity ratio of the injection on the intake stroke to that on the compression stroke near the engine operating condition in which the control unit 50 permits conversion of the stratified stoichiometric combustion mode to the homogeneous combustion mode (as shown in FIG. 11, which shows the fuel injection quantity ratio of the injection on the compression stroke).

This invention is also applicable if the fuel is injected only on the compression stroke in the stratified stoichiometric combustion mode; however the stratified air fuel mixture that is richer-than-stoichiometric is produced around the ignition plug 6, and there is little fuel in the background of the stratified air fuel mixture. In that case, it is also desirable that the average air fuel ratio is nearly equal to the stoichiometric air fuel ratio throughout the entirety of the combustion chamber 17.

When the stratified stoichiometric combustion mode is operated, it is also desirable that the ignition timing in the steady state be retarded more than the ignition timing in the stratified lean combustion mode (shown at the step S10 in FIG. 2). However, the invention is also applicable to an embodiment wherein the ignition timing is kept at MBT in the stratified stoichiometric combustion mode, because MBT in the stratified stoichiometric combustion mode is more retarded than that in the conventional combustion mode such as the homogeneous combustion mode, the stratified lean combustion mode, and so on. Thus, even in such an embodiment, the engine stability can be improved more than the conventional internal combustion engine, and it is possible to achieve the high engine stability and high exhaust gas temperature at once.

The present invention is applicable to any embodiments that are convertible to the homogeneous combustion mode and the stratified combustion mode that can raise the exhaust gas temperature by producing the stratified air fuel mixture richer-than-stoichiometric around the ignition plug 6, combusting it, and generating the products of incomplete combustion such as CO.

Furthermore, in the first embodiment, the fuel injectors 5 that inject fuel directly to the combustion chambers 17 are configured to inject both on the intake stroke and on the compression stroke, to reduce costs, and to make it easy to dispose them on the engine 1. However, additional injectors may be provided on the intake port to inject fuel on the intake stroke. Such injectors can be of lower fuel flow rate, and thus they can improve the accuracy of the fuel injection quantity.

A second embodiment of the present invention is described hereinafter, which can also reduce the torque differentiation when the combustion mode is converted, by adjusting the fuel injection timing on the compression stroke in the stratified stoichiometric combustion mode. The control system of the second embodiment as a whole is similar to that shown in FIGS. 1 and 2 and the description thereof.

Figure 12:
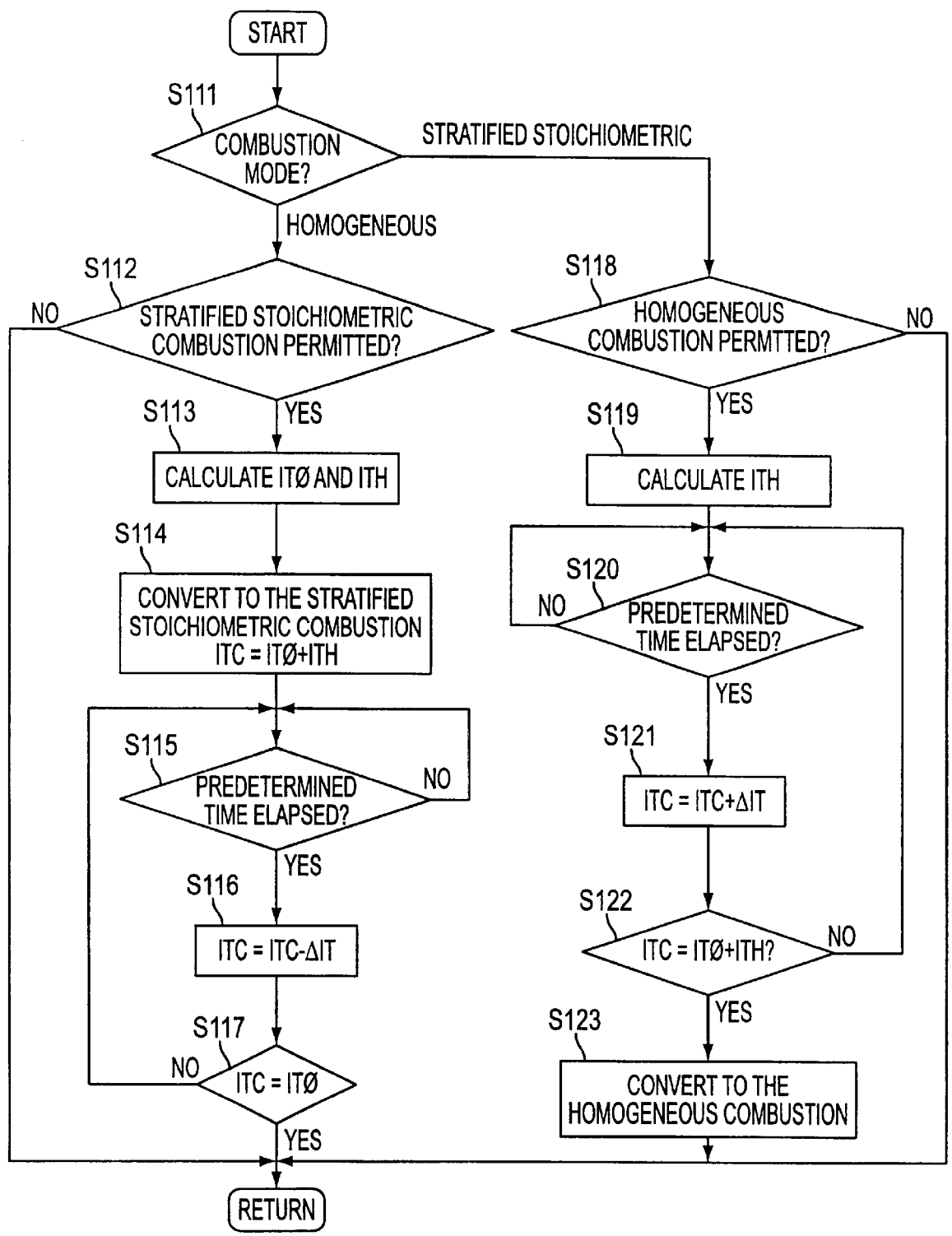
FIG. 12 is a flowchart according to a second embodiment of the present invention showing a control process for adjusting fuel injection timing on the compression stroke in the stratified stoichiometric combustion mode when the combustion mode is converted.

FIG. 12 is a flowchart showing a control process of adjusting the fuel injection timing.

At a step S111, the control unit 50 checks which combustion mode is operated, the homogeneous combustion mode or the stratified stoichiometric combustion mode.

When the control unit 50 judges that the homogeneous combustion mode is operated, it proceeds to a step S112, and checks if the operation of the stratified stoichiometric combustion mode is permitted (i.e. checks if the stratified stoichiometric combustion mode is selected at the step S7 in FIG. 2).

If the stratified stoichiometric combustion mode is permitted, or if there is a request to convert the present homogeneous combustion mode to the stratified stoichiometric combustion mode for raising the exhaust gas temperature, the control unit 50 proceeds to a step S113, and calculates a basic fuel injection timing IT0 on the compression stroke in the stratified stoichiometric combustion mode and an adjustment value of advancing the fuel injection timing ITH for reducing the torque differentiation according to the present engine operating conditions (such as the engine revolution speed, the engine load) by looking up predetermined maps. When the control unit 50 advances the fuel injection timing ITC on the compression stroke, the intake air quantity that can be mixed with fuel in the combustion chamber 17 increases, hence the degree of homogeneity of the air fuel mixture increases, therefore the control unit 50 can reduce the torque differentiation. The control unit 50 sets the adjustment value ITH at such a value that it can not only sufficiently reduce the torque differentiation when the combustion mode is converted, but also it can make possible operation of the stratified combustion mode by means of the fuel injection on the compression stroke so that the stratified air fuel mixture can be produced.

At a step S114, the control unit 50 converts the homogeneous combustion mode to the stratified stoichiometric combustion mode. At this time, the control unit 50 controls the fuel injection timing ITC on the compression stroke at such a value that the basic fuel injection timing IT0 is adjusted by the adjustment value ITH (i.e. the summation of IT0 and ITH in this embodiment) in the advancing direction.

In that manner, the torque differentiation can be reduced in the stratified stoichiometric combustion mode by the control unit 50 increasing the degree of homogeneity.

At a step S115, the control unit 50 checks whether a predetermined time has elapsed since the control unit 50 has reached here. If the answer is YES, the control unit 50 proceeds to a step S116. If the answer is NO, the control unit 50 stays at the step S115, and continues to count the elapsed time. At a step S116, the control unit 50 retards the injection timing on the compression stroke by a unit adjustment value ΔIT, and then at a step S117, the control unit 50 checks whether the ignition timing ITC reaches the basic fuel injection timing IT0 determined according to the present engine operating conditions. If the ignition timing ITC reaches IT0 (or when the answer at the step S117 is YES), the control unit 50 finishes the flow. Or if the ignition timing ITC has not reached IT0 yet, the control unit 50 returns to the step S115, and begins to count the elapsed time again until the predetermined time has passed. After the control unit 50 finishes the flow, it continues a fuel injection timing control according to the engine operating conditions in the stratified stoichiometric combustion mode.

On the other hand, when the control unit 50 converts the stratified stoichiometric combustion mode to the homogeneous combustion mode, the flow proceeds in the opposite direction. When the control unit 50 judges that the stratified stoichiometric combustion mode is operated at the step S111, it proceeds to a step S118, and checks whether the operation of the homogeneous combustion mode is permitted (i.e. whether the homogeneous combustion mode is selected at the steps S7 and S10 in FIG. 2).

If the homogeneous combustion mode is permitted, or if there is a request to convert the present stratified stoichiometric combustion mode to the homogeneous combustion mode, the control unit 50 proceeds to a step S119, and calculates the adjustment value of advancing the fuel injection timing ITH for reducing the torque differentiation corresponding to the basic fuel injection timing on the compression stroke IT0 that is determined according to the present engine operating conditions.

Then, every time the control unit 50 judges that the predetermined time has elapsed at a step S120, it advances the fuel injection timing ITC by the unit adjustment value ΔIT at a step S121, and at a step S122, checks whether the summation of every unit adjustment value ΣΔIT reaches the adjustment value of advancing the fuel injection timing ITH, or whether the ignition timing ITC reaches the value that is determined by adjusting the basic fuel injection timing IT0 by the adjustment value ITH (i.e. the summation of IT0 and ITH in this embodiment). When the control unit 50 judges that the fuel injection timing ITC reaches the value (or the answer at the step S122 is YES), it proceeds to a step S123, and converts to the homogeneous combustion mode. At the time when the combustion mode is converted or later (at the step S123 or later), the fuel injection timing is controlled by the engine operating conditions.

As described above, the control unit 50 can reduce the torque differentiation by means of increasing the degree of homogeneity of the air fuel mixture in the stratified stoichiometric combustion mode before it is converted to the homogeneous combustion mode.

Figure 13:
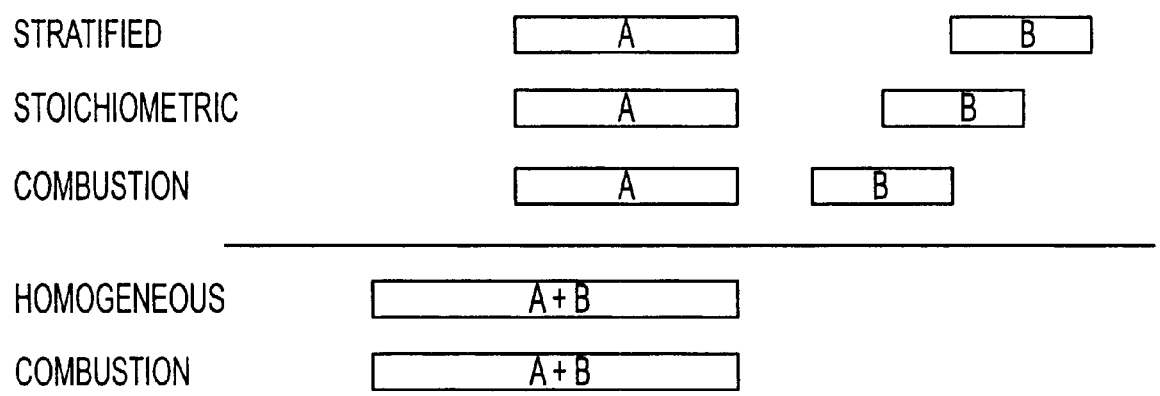
FIG. 13 is a time chart according to the second embodiment showing a change of the fuel injection timing.

FIG. 13 is a time chart regarding the second embodiment of this invention that shows the change of the fuel injection timing about the time when the control unit 50 converts the combustion mode. In FIG. 13, the fuel injection timing changes continuously to the upside from the bottom in the case that the combustion mode is converted from the homogeneous combustion mode to the stratified stoichiometric combustion mode, and it changes to the downside from the top continuously in the case that the combustion mode is converted from the stratified stoichiometric combustion mode to the homogeneous combustion mode (it is the same manner in the other time charts described below, FIGS. 15–21).

Later, other embodiments of the present invention are described wherein the torque differentiation is reduced by controlling the fuel injection quantity. As with the second embodiment, the control system as a whole is similar to that shown in FIGS. 1 and 2 and the description thereof.

Figure 14:
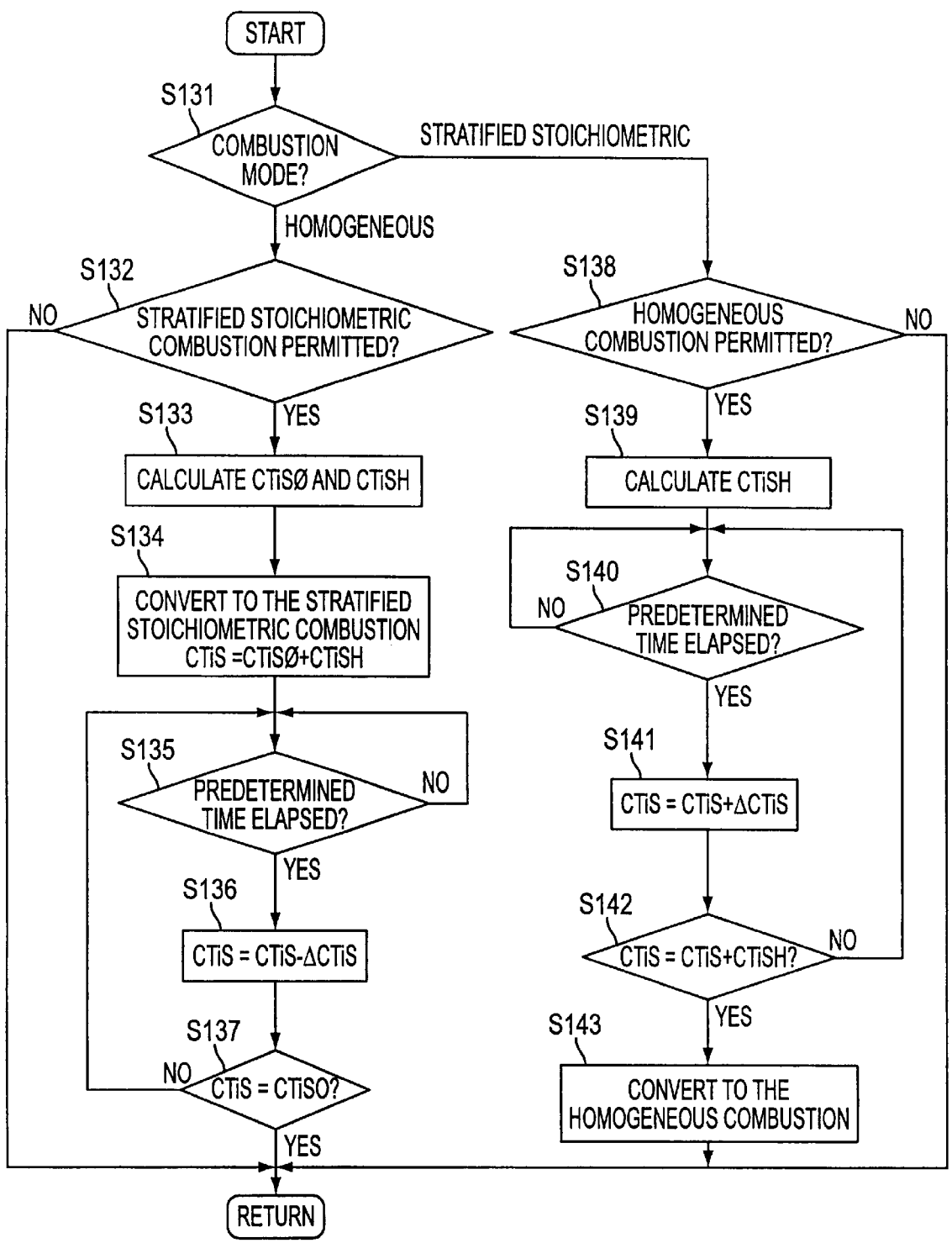
FIG. 14 is a flowchart according to a third embodiment of the present invention showing a control process for adjusting fuel quantity injected on the compression stroke in the stratified stoichiometric combustion mode when the combustion mode is converted.

At first, according to a flowchart shown in FIG. 14, the third embodiment of the present invention is provided, which can reduce the torque differentiation by means of controlling the fuel injection quantity on the compression stroke.

At steps S131 and S132, when the control unit 50 judges that the homogeneous combustion mode is operated and the stratified stoichiometric combustion mode is permitted in the same manner as the steps S111 and S112 in FIG. 12, the control unit 50 proceeds to a step S133, and calculates a basic fuel injection quantity CTiS0 on the compression stroke in the stratified stoichiometric combustion mode according to the present engine operating conditions, and an adjustment value of increasing the fuel injection quantity CTiSH for reducing the torque differentiation by looking up predetermined maps. The control unit 50 can reduce the torque differentiation, by increasing the fuel quantity injected on the compression stroke and thereby increasing the engine torque. The control unit 50 sets the adjustment value CTiSH at such a value that it can not only sufficiently reduce the torque differentiation when the combustion mode is converted, but also it can provide the stratified combustion mode by means of the fuel injection on the compression stroke so that the stratified air fuel mixture can be produced.

At a step S134, the control unit 50 converts the homogeneous combustion mode to the stratified stoichiometric combustion mode. At this time, the control unit 50 controls the fuel injection quantity CTiS on the compression stroke at such a value that the basic fuel injection quantity CTiS0 is adjusted in the increasing direction by the adjustment value CTiSH (i.e. CTiS=CTiS0+CTiSH).

In that manner, the torque differentiation can be reduced by increasing the engine torque in the stratified stoichiometric combustion mode when the combustion mode is converted.

At a step S135, the control unit 50 checks whether a predetermined time has elapsed since the control unit 50 has reached here. When the answer is YES, the control unit 50 proceeds to a step S136. If the answer is NO, the control unit 50 stays at the step S135, and continues to count the elapsed time.

At a step S136, the control unit 50 decreases the fuel injection quantity CTiS on the compression stroke by a unit adjustment value ΔCTiS, and then at a step S137, the control unit 50 checks whether the fuel injection quantity CTiS reaches the basic fuel injection quantity CTiS0 determined according to the present engine operating conditions. If the ignition timing CTiS has not reached CTiS0 yet, the control unit 50 returns to the step S135, and begins to count the elapsed time again until the predetermined time has elapsed. After the fuel injection quantity CTiS reaches the basic fuel injection quantity CTiS0, the control unit 50 continues the fuel injection quantity control according to the engine operating conditions in the stratified stoichiometric combustion mode.

On the other hand, in the case that the control unit 50 converts the stratified stoichiometric combustion mode to the homogeneous combustion mode, the flow proceeds in the opposite direction. When the control unit 50 judges that the stratified stoichiometric combustion mode is operated at the step S131, it proceeds to a step S138. Then, if it judges that the operation of the homogeneous combustion mode is permitted at the step S138, it proceeds to a step S139, and calculates the adjustment value of increasing the fuel injection quantity CTiSH corresponding to the basic fuel injection quantity CTiS0 on the compression stroke for reducing the torque differentiation.

Then, every time the control unit 50 judges that the redetermined time has elapsed at a step S140, it increases the fuel injection quantity CTiS by the unit adjustment value ΔCTiS at a step S141, and at a step S142, checks whether the summation of every unit adjustment value ΣΔCTiS reaches the adjustment value of increasing the fuel injection quantity CTiSH, or whether the fuel injection quantity CTiS reaches the value determined by means of adjusting the basic fuel injection quantity CTIS0 by the adjustment value CTiSH. When the control unit 50 judges that the fuel injection quantity CTiS reaches the value (or the answer at the step S142 is YES), it proceeds to a step S143, and converts to the homogeneous combustion mode. At the time when the combustion mode is converted or later (at the step S143 or later), the fuel injection quantity is controlled by the engine operating conditions (i.e. without the adjustment value CTiSH).

As described above, the control unit 50 can reduce the torque differentiation by means of increasing the engine torque in the stratified stoichiometric combustion mode before it converts to the homogeneous combustion mode.

Figure 15:
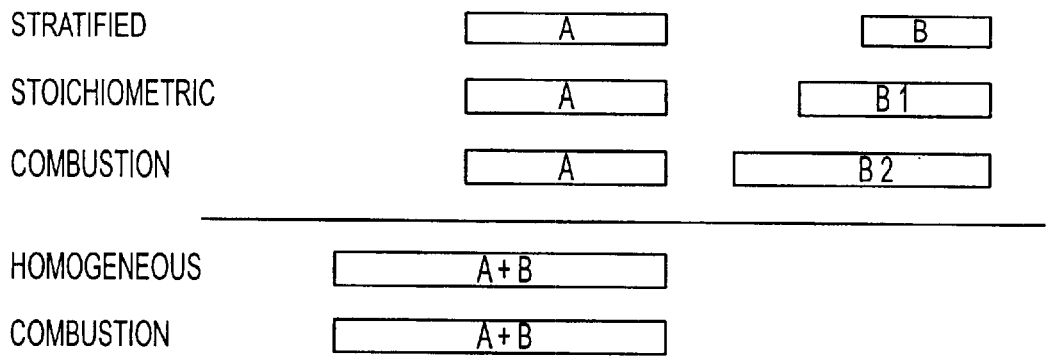
FIG. 15 is a time chart according to the third embodiment showing a change of the fuel injection quantity.

FIG. 15 is a time chart regarding the third embodiment of this invention that shows the change of the fuel injection quantity about the time when the control unit 50 converts the combustion mode.

Figure 16:
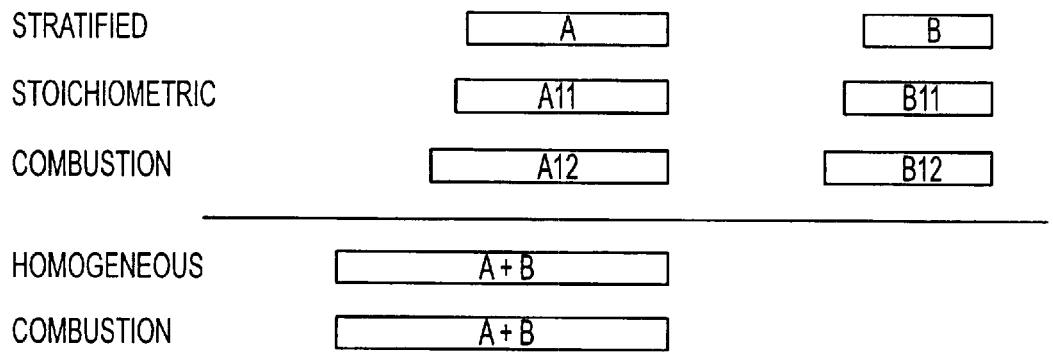
FIG. 16 is a time chart according to a fourth embodiment showing changes of fuel quantity injected on the intake stroke and the compression stroke in the stratified stoichiometric combustion mode when the combustion mode is converted.

The fuel injection quantity on the intake stroke may be adjusted in addition to the adjustment on the compression stroke in the stratified stoichiometric combustion mode. In this manner, it is also possible to reduce the torque differentiation. FIG. 16 is a time chart of such an embodiment as the fourth embodiment of this invention that shows the change of the fuel injection quantity about the time when the control unit 50 converts the combustion mode. A flowchart of the fourth embodiment is omitted, because it is very similar to that of the third embodiment (FIG. 14). In the fourth embodiment, the adjustment value of the fuel injection quantity CTiSH includes the adjustment value of the fuel quantity injected on the intake stroke, and it is configured to be divided into the injection on the compression stroke and that on the intake stroke, instead of applying all the adjustment value CTiSH on the compression stroke as is described in the third embodiment. A division ratio of the fuel injection quantity on the intake stroke and that on the compression stroke may be set constant, and the adjustment value of the fuel injection quantity may be set divided according to the division ratio. In this manner, it is possible to reduce the change of combustibility due to the adjustment of the fuel injection quantity described in the fourth embodiment.

Figure 17:
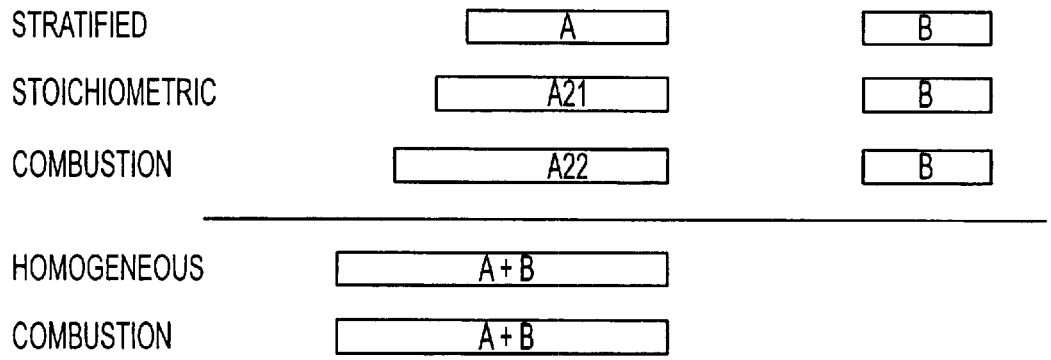
FIG. 17 is a time chart according to a fifth embodiment showing a change of fuel quantity injected on the intake stroke in the stratified stoichiometric combustion mode when the combustion mode is converted.

Also, only the fuel injection quantity on the intake stroke may be adjusted instead of adjusting that on the compression stroke in the stratified stoichiometric combustion mode to reduce the torque differentiation. A time chart of such an embodiment is shown in FIG. 17, as the fifth embodiment of this invention, which describes the change of the fuel injection quantity about the time when the control unit 50 converts the combustion mode.

Figure 18:
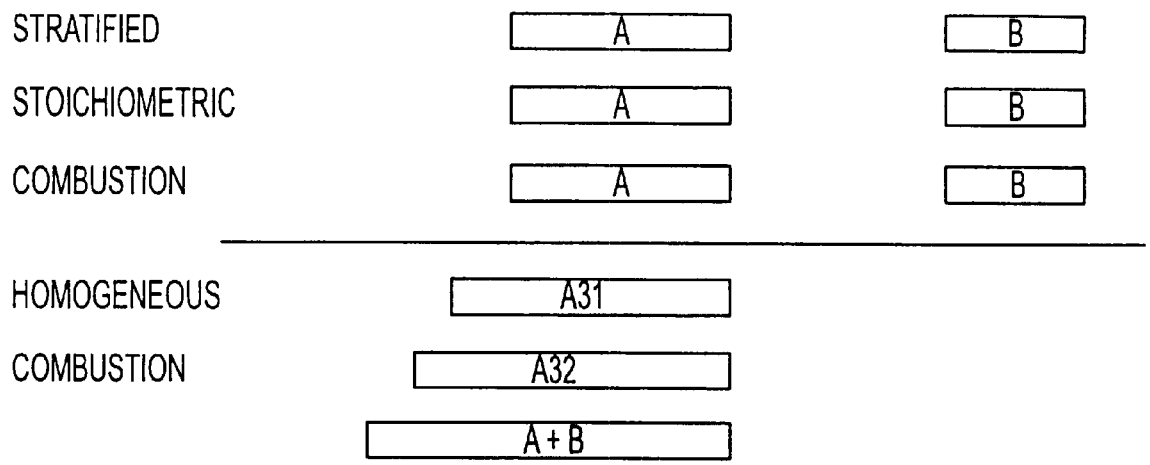
FIG. 18 is a time chart according to a sixth embodiment showing a change of fuel quantity injected in the homogeneous combustion mode when the combustion mode is converted.

Furthermore, it is possible to reduce the torque differentiation by means of decreasing the fuel injection quantity in the homogeneous combustion mode, instead of increasing that in the stratified stoichiometric combustion mode as is mentioned above. FIG. 18 is a time chart regarding the sixth embodiment of the present invention that shows the change of the fuel injection quantity about the time when the control unit 50 converts the combustion mode. According to FIG. 18, in converting the homogeneous combustion mode to the stratified stoichiometric combustion mode, the control unit 50 gradually adjusts the fuel injection quantity in the decreasing direction from the amount determined from the engine operating conditions by the amount that the control unit 50 can reduce the torque differentiation when the combustion mode is converted, and then it converts to the stratified stoichiometric combustion mode. The fuel injection quantity is controlled according to the engine operating conditions in the stratified stoichiometric combustion mode when and after the combustion mode is converted thereto.

In converting the stratified stoichiometric combustion mode to the homogeneous combustion mode, the control unit 50 takes the process described above in the opposite direction. That is, just after the combustion mode is converted to the homogeneous combustion mode, the control unit 50 decreases the fuel injection quantity at once by the amount that the torque differentiation can be canceled, and then, it gradually increases the fuel injection quantity to the amount determined from the engine operating condition in the homogeneous combustion mode.

In this manner, it is also possible to reduce the torque differentiation when the combustion mode is converted, by decreasing the fuel injection quantity in the homogeneous combustion mode.

In the embodiments mentioned above, the control unit 50 controls the fuel injection quantity at the same amount between the homogeneous combustion mode and stratified stoichiometric combustion mode (in the case of stratified stoichiometric combustion mode, the fuel injection quantity is defined as the summation of the fuel quantity injected on the intake stroke and on the compression stroke), as long as the engine 1 is in the same operating conditions (i.e. the same engine revolution speed, the same engine load) and there is no permission to convert the combustion mode. Thus, the control unit 50 gradually adjusts the fuel injection quantity before or after the combustion mode is converted. Thereby the air fuel ratio can maintain the stoichiometric ratio (λ=1) while each combustion mode is maintained in order to maintain the performance of purifying the exhaust gas.

However, as far as only the reduction of the torque differentiation is concerned, other embodiments may be used wherein the control unit 50 adjusts the fuel injection quantity only once at the same time it converts the combustion mode (i.e. increase if converting the homogeneous combustion mode to the stratified stoichiometric combustion mode, and decrease if converting the stratified stoichiometric combustion mode to the homogeneous combustion mode).

Furthermore, in the embodiments described above, the fuel injection in the stratified stoichiometric combustion mode is divided into two portions, one on the intake stroke, and the other on the compression stroke. However, the present invention is applicable to designs wherein the fuel is injected only on the compression stroke in the stratified stoichiometric combustion mode; only the stratified air fuel mixture that is richer-than-stoichiometric is produced around the ignition plug 6, and there is little fuel in the background of the stratified air fuel mixture. In that case, it is also desirable that the average air fuel ratio be near the stoichiometric ratio throughout the entirety of the combustion chamber 17.

Figure 19:
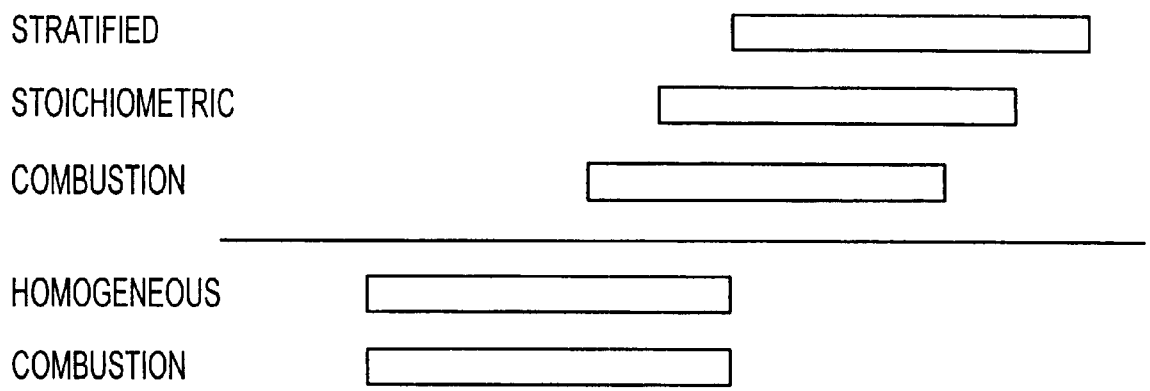
FIG. 19 is a time chart according to a seventh embodiment, in which fuel is injected only on the compression stroke in the stratified stoichiometric combustion mode, showing a change of fuel injection timing in the stratified stoichiometric combustion mode when the combustion mode is converted.
Figure 20:
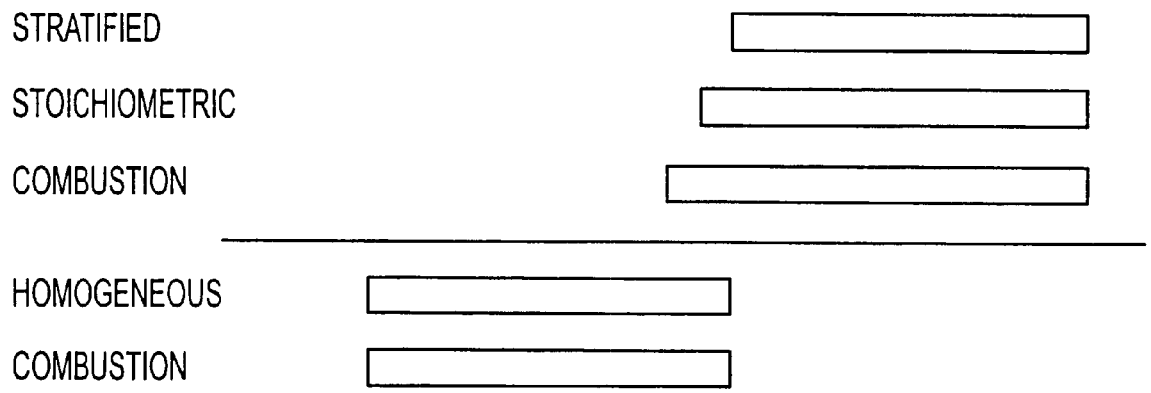
FIG. 20 is a time chart according to an eighth embodiment, in which fuel is injected only on the compression stroke in the stratified stoichiometric combustion mode, showing a change of fuel quantity injected in the stratified stoichiometric combustion mode when the combustion mode is converted.
Figure 21:
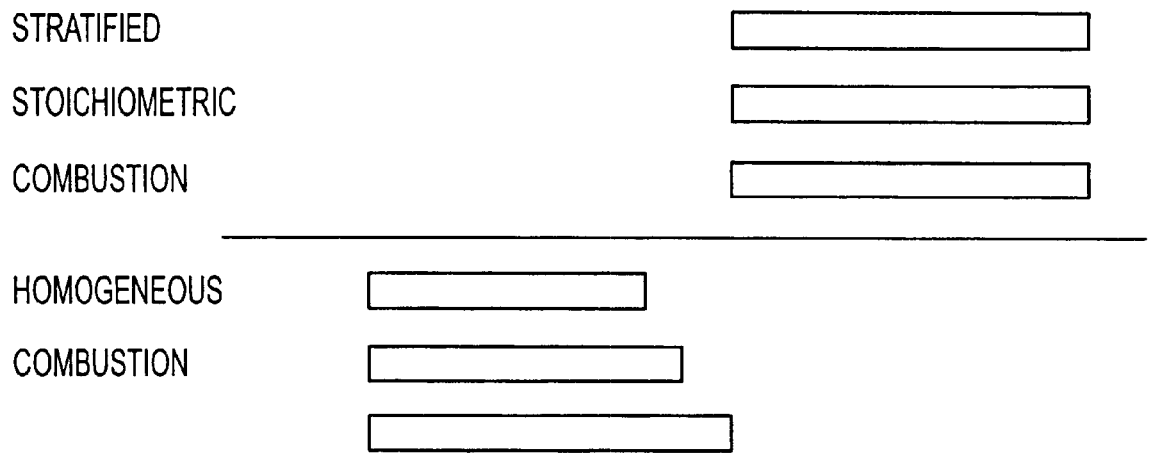
FIG. 21 is a time chart according to a ninth embodiment, in which fuel is injected only on the compression stroke in the stratified stoichiometric combustion mode, showing a change of fuel quantity injected in the homogeneous combustion mode when the combustion mode is converted.

FIGS. 19~21 are time charts of such embodiments mentioned above, as the seventh embodiment (FIG. 19), eighth embodiment (FIG. 20) and ninth embodiment (FIG. 21), respectively. FIG. 19 shows the change of the fuel injection timing, FIG. 20 shows the change of the fuel injection quantity injected in the stratified stoichiometric combustion mode, and FIG. 21 shows the change of the fuel injection quantity injected in the homogeneous combustion mode, about the time when the control unit 50 converts the combustion mode.

Although the present invention has been described above by reference to certain embodiments of the invention, the invention is not limited to the embodiments described above. Modifications and variations of the embodiments described above will occur to those skilled in the art, in light of the above teachings. The scope of the present invention is defined with reference to the following claims.

What is claimed is:

1. A control system for an internal combustion engine comprising:
    an internal combustion engine having a combustion chamber;
    an injector for supplying fuel to said combustion chamber to produce an air fuel mixture therein;
    an ignition plug provided for said combustion chamber to ignite said air fuel mixture; and
    a controller configured to:
        detect a need to convert a combustion mode from one of a homogeneous mode and stratified mode to the other of the homogenous mode and stratified mode,
        adjust a parameter that affects engine torque to adjust the engine torque while operating in said one of the homogeneous and stratified mode to reduce a torque difference due to mode conversion which would otherwise occur if the mode conversion would take place without such a torque adjustment, and
        convert the combustion mode to the other of the homogeneous mode and stratified mode after having completed the torque adjustment operation.

2. The control system as claimed in claim 1, wherein said controller:
    operates said stratified combustion mode by controlling fuel injection quantity, fuel injection timing, and ignition timing so as to produce and combust a stratified air fuel mixture that has a richer-than-stoichiometric air fuel ratio around said ignition plug;
    operates said homogeneous combustion mode by controlling said fuel injection quantity, said fuel injection timing, and said ignition timing so as to produce and combust homogeneous air fuel mixture that is distributed uniformly throughout said combustion chamber;
    converts said combustion mode between said stratified combustion mode and said homogeneous combustion mode upon occurrence of a request according to said engine operating condition; and
    adjusts said parameter so as to reduce said change of said engine torque due to said combustion mode being converted.

3. The control system as claimed in claim 1 further comprising an exhaust system having an exhaust passage connected to said internal combustion engine and an exhaust emission control device disposed in said exhaust passage, wherein said controller checks activeness or inactiveness of said exhaust emission control device and permits said stratified combustion mode when said exhaust emission control device is inactive.

4. The control system as claimed in claim 1, wherein said controller sets an average air fuel ratio over the entirety of said combustion chamber at a stoichiometric ratio in said stratified combustion mode.

5. The control system as claimed in claim 1, wherein said controller controls said engine such that said stratified combustion mode is operated by dividing a fuel injection into a first portion injected on an intake stroke for producing a leaner-than-stoichiometric air fuel mixture throughout said combustion chamber and a second portion injected on a compression stroke for producing a richer-than-stoichiometric air fuel mixture around said ignition plug, and combusting said air fuel mixture produced in said combustion chamber.

6. The control system as claimed in claim 5, wherein fuel injection quantity of said first portion is equal to or larger than fuel injection quantity of said second portion.

7. The control system as claimed in claim 1, wherein said controller controls said engine such that said homogeneous combustion mode is used for starting said internal combustion engine.

8. A control system for an internal combustion engine comprising:
    an internal combustion engine having a combustion chamber;
    an injector for supplying fuel to said combustion chamber to produce an air fuel mixture therein;
    an ignition plug provided for said combustion chamber to ignite said air fuel mixture; and
    a controller configured to:
        detect a need to convert a combustion mode from one of a homogeneous mode and stratified mode to the other of the homogeneous mode and stratified mode,
        adjust engine torque while operating in said one of the homogeneous mode and stratified mode to reduce a torque difference due to mode conversion which would otherwise occur if the mode conversion would take place without such a torque adjustment, and
        convert the combustion mode to the other of the homogeneous mode and stratified mode after having completed the torque adjusting operation.

9. The control system as claimed in claim 8, wherein said ignition timing while said stratified combustion mode is maintained is retarded more than said ignition timing while said homogeneous combustion mode is maintained.

10. The control system as claimed in claim 8, wherein said controller:
    gradually adjusts said ignition timing from an occurrence of a request for converting said combustion mode until said combustion mode is converted in one direction;
    adjusts said ignition timing in the other direction to reduce said change of said engine torque at the same time the combustion mode is converted; and
    gradually adjusts said ignition timing after said combustion mode is converted in the same direction as before said combustion mode is converted.

11. The control system as claimed in claim 10, wherein said controller adjusts intake airflow rate to reduce a change of said engine torque.

12. The control system as claimed in claim 11, further comprising:
    an intake passage connected to said internal combustion engine;
    a throttle valve disposed in said intake passage for controlling intake airflow rate; and
    a throttle controller for electrically controlling an opening degree of said throttle valve, and for adjusting said intake airflow rate in response to said controller adjusting said ignition timing.

13. The control system as claimed in claim 8, wherein said controller controls said engine such that said stratified combustion mode is operated by dividing a fuel injection into a first portion injected on an intake stroke for producing a leaner-than-stoichiometric air fuel mixture throughout said combustion chamber and a second portion injected on a compression stroke for producing a richer-than-stoichiometric air fuel mixture around said ignition plug, and combusting said air fuel mixture produced in said combustion chamber.

14. The control system as claimed in claim 13, wherein a fuel injection quantity ratio of said first portion to said second portion is increased near an engine operating condition in which a conversion to said homogeneous combustion mode is permitted in said stratified combustion mode.

15. The control system as claimed in claim 8, wherein said stratified combustion mode is operated by controlling fuel injection quantity, fuel injection timing, and said ignition timing on a compression stroke so that air fuel mixture around said ignition plug can be of ignitable richer-than-stoichiometric ratio and be sufficiently atomized for ignition.

16. A controller to operate an internal combustion engine, the controller comprising:

an input interface to obtain input signals;

a memory connected to said input interface to store a program to operate a combustion mode selectively between a homogeneous combustion mode and a stratified combustion mode in response to said input signals, said program configured to:

detect a need to convert a combustion mode from one of the homogeneous mode and stratified mode to the other of the homogenous mode and stratified mode, adjust a parameter that affects engine torque to adjust the engine torque while operating in said one of the homogeneous mode and stratified mode to reduce a torque difference due to mode conversion which would otherwise occur if the mode conversion would take place without such a torque adjustment, and convert the combustion mode to the other of the homogeneous mode or stratified mode after having completed the torque adjustment operation;

a processor connected to said memory to execute the program; and an output interface connected to said memory to output command signals to said internal combustion engine.

17. The controller as claimed in claim 16, wherein said memory further stores a program to operate said stratified combustion mode by controlling fuel injection quantity, fuel injection timing, and ignition timing so as to produce and combust a stratified air fuel mixture that has a richer-than-stoichiometric air fuel ratio around an ignition plug of said engine, to operate said homogeneous combustion mode by controlling said fuel injection quantity, said fuel injection timing, and said ignition timing so as to produce and combust a homogeneous air fuel mixture that is distributed uniformly throughout a combustion chamber of said engine, to convert said combustion mode between said stratified combustion mode and said homogeneous combustion mode upon occurrence of a request according to an input signal, and to adjust said parameter so as to reduce said change of said engine torque due to said combustion mode being converted.

* * * * *